(12) United States Patent
Takata

(10) Patent No.: US 9,159,002 B2
(45) Date of Patent: Oct. 13, 2015

(54) RECORDING SHEET TRANSPORT APPARATUS AND PRINTING SYSTEM INCORPORATING SAME

(71) Applicant: SHARP KABUSHIKI KAISHA, Osaka-shi, Osaka (JP)

(72) Inventor: Sohichi Takata, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/370,347

(22) PCT Filed: Dec. 21, 2012

(86) PCT No.: PCT/JP2012/083207
§ 371 (c)(1),
(2) Date: Jul. 2, 2014

(87) PCT Pub. No.: WO2013/108545
PCT Pub. Date: Jul. 25, 2013

(65) Prior Publication Data
US 2014/0368848 A1    Dec. 18, 2014

(30) Foreign Application Priority Data
Jan. 16, 2012    (JP) ................................. 2012-005940

(51) Int. Cl.
*B65H 5/22* (2006.01)
*B65H 29/66* (2006.01)
(Continued)

(52) U.S. Cl.
CPC .............. *G06K 15/16* (2013.01); *B65H 29/125* (2013.01); *B65H 29/60* (2013.01); *B65H 2404/14* (2013.01); *B65H 2404/16* (2013.01); *B65H 2801/06* (2013.01)

(58) Field of Classification Search
CPC .................. G03G 2215/00021; G03G 15/235; G03G 15/6558; G03G 15/6564; G03G 15/602; G03G 15/232; G03G 15/6538; B65H 2403/40; B65H 2403/72; B65H 3/0676; B65H 3/0684; B65H 5/602; B65H 5/6564; B65H 5/6567

USPC ................ 358/1.13; 271/110, 126, 202, 3.17; 399/15, 367, 401
See application file for complete search history.

(56) References Cited

U.S. PATENT DOCUMENTS

| 6,530,569 B2 | 3/2003 | Yamagishi |
| 2001/0054787 A1 | 12/2001 | Yamagishi |

(Continued)

FOREIGN PATENT DOCUMENTS

| JP | 64-46770 | 2/1989 |
| JP | 2002-167076 | 6/2002 |
| JP | 2005-343615 | 12/2005 |

OTHER PUBLICATIONS

English Machine Translation of JP 2009-190857-A (Yamakawa, Published Aug. 27, 2009).*

(Continued)

*Primary Examiner* — Benny Q Tieu
*Assistant Examiner* — Juan M Guillermety
(74) *Attorney, Agent, or Firm* — Nixon & Vanderhye, P.C.

(57) ABSTRACT

A relay transport apparatus (400) includes a first transport path, a plurality of first transport sections (63), a plurality of driving sections (64), and a drive transmission section (65). The first transport path is formed so as to couple a carry-in port and a carry-out port. The first transport path includes a plurality of segments (S2*a* and S2*b*). The plurality of first transport sections (63) are disposed along the first transport path. The first transport sections are configured to transport the paper sheet carried in from the carry-in port to the carry-out port along the first transport path. The plurality of driving sections (64) correspond to the respective segments. The plurality of driving sections (64) are configured to drive the first transport section in the corresponding segment. The drive transmission section (65) drives the plurality of first transport sections based on an output from a predetermined one driving section (64*a*) when only the predetermined one driving section operates among the plurality of driving sections. The drive transmission section (65) drives the plurality of first transport sections based on outputs from the corresponding driving sections when the plurality of driving sections operate.

23 Claims, 12 Drawing Sheets

(51) Int. Cl.
  *G06K 15/16* (2006.01)
  *B65H 29/60* (2006.01)
  *B65H 29/12* (2006.01)

(56) References Cited

U.S. PATENT DOCUMENTS

2003/0129009 A1* 7/2003 Matsuyama et al. .......... 399/401
2004/0212139 A1* 10/2004 Nagao et al. ................. 271/110
2004/0240916 A1* 12/2004 Takata et al. .................. 399/367
2008/0150221 A1* 6/2008 Sugiyama et al. ............ 271/202
2010/0316403 A1* 12/2010 Furuya et al. .................... 399/67
2011/0194860 A1* 8/2011 Peng et al. ....................... 399/15
2012/0062925 A1* 3/2012 Nakamura ................... 358/1.15

OTHER PUBLICATIONS

International Search Report for PCT/JP2012/083207 mailed Apr. 2, 2013.

* cited by examiner

RECORDING SHEET TRANSPORT APPARATUS AND PRINTING SYSTEM INCORPORATING SAME

This application is the U.S. national phase of International Application No. PCT/JP2012/083207 filed 21 Dec. 2012 which designated the U.S. and claims priority to JP 2012-005940 filed 16 Jan. 2012, the entire contents of each of which are hereby incorporated by reference.

TECHNICAL FIELD

The present invention relates to a relay transport apparatus coupled between an image forming apparatus and a post-processing apparatus to transport a paper sheet from the image forming apparatus to the post-processing apparatus and relates to a printing system using the relay transport apparatus.

BACKGROUND ART

This type of relay transport apparatus is coupled between an image forming apparatus, which forms images on paper sheets, and a post-processing apparatus, which performs post processing on the paper sheets on which images are formed by the image forming apparatus. This relay transport apparatus generally includes a transport path, a transport unit, and a driving unit (for example, a motor). The transport path transports paper sheets from the image forming apparatus to the post-processing apparatus. The transport unit transports the paper sheets along the transport path. The driving unit drives the transport unit. Conventional relay transport apparatuses have two types: one-motor drive system and a two-motor drive system (PATENT LITERATURE 1).

(Relay Transport Apparatus of One-Motor Drive System)

The relay transport apparatus of one-motor drive system includes one motor as a driving unit. This motor drives all transport units. Since this relay transport apparatus includes only one motor as the driving unit, advantageous in reduction in power consumption. However, with this relay transport apparatus of one-motor drive system, since the one motor drives all the transport units, there is a drawback that transport speeds of a plurality of respective transport units cannot be individually changed.

Due to this drawback, for example, in the case where the transport speed is accelerated in the relay transport apparatus and paper sheets (in particular, paper sheets whose length in a transport direction is equal to or more than a predetermined reference length) are transported, the following drawback is present. That is, to increase the transport speed in the relay transport apparatus, the transport speeds of all the transport units need to be increased. However, to carry in the subsequent paper sheet from the image forming apparatus to the relay transport apparatus, the transport speed in the relay transport apparatus needs to be decelerated to match the transport speed at the image forming apparatus side.

Accordingly, to carry in the subsequent paper sheet from the image forming apparatus to the relay transport apparatus, it is necessary to waited for the paper sheet during transport completely to pass though the relay transport apparatus and then decelerate the transport speed in the relay transport apparatus. Subsequently, the subsequent paper sheet needs to be carried in from the image forming apparatus to the relay transport apparatus. Therefore, there is a drawback of long paper interval.

(Relay Transport Apparatus of Two-Motor Drive System)

Meanwhile, the relay transport apparatus of two-motor drive system includes two motors as the driving units. These respective motors drive a plurality of transport units. The plurality of transport units correspond to any one of the respective motors and are driven by the corresponding motors. For example, the transport path of the relay transport apparatus is divided into two. One motor drives the respective transport units in one section (for example, an upstream side). The other motor drives the respective transport units in the other section (for example, a downstream side).

This relay transport apparatus of two-motor drive system has two motors as the driving units. Accordingly, individually driving the respective motors allows changing the transport speeds of the plurality of transport units individually by the respective corresponding motors.

Accordingly, when the paper sheet passes through the segment at the upstream side of the transport path in the relay transport apparatus, only the transport speed of the respective transport units in the segment at the upstream side can be decelerated. That is, when the subsequent paper sheet is carried in from the image forming apparatus to the relay transport apparatus, it is not necessary to wait until the paper sheet during transport completely passes through the relay transport apparatus. This is advantageous in that the paper sheets can be transported at shorten paper interval. However, the relay transport apparatus of two-motor drive system uses two motors; therefore, there is a drawback of large power consumption.

CITATION LIST

Patent Literature

PATENT LITERATURE 1: Japanese Unexamined Patent Application Publication No. 2005-343615

SUMMARY OF INVENTION

Technical Problem

As described above, the relay transport apparatus of two-motor drive system allows changing the transport speeds of the plurality of transport units by the respective corresponding motors. This is advantageous of short paper interval. However, since a plurality of motors are driven, there is a drawback of large power consumption.

The present invention has been made to solve the above-described problems, and it is an object of the present invention to provide a relay transport apparatus with a plurality of driving units that can switch between one-motor drive or multiple-motor drive and a printing system using the relay transport apparatus.

Solutions to the Problems

To solve the above-described problems, a relay transport apparatus of the present invention includes a carry-in port to which a paper sheet is to be carried in, a carry-out port from which the paper sheet is to be carried out, a first transport path, a plurality of first transport sections, a plurality of driving sections, and a drive transmission section. The first transport path is formed so as to couple the carry-in port and the carry-out port. The first transport path includes a plurality of segments. The plurality of first transport sections are disposed along the first transport path. The first transport sections are configured to transport the paper sheet carried in from the carry-in port to the carry-out port along the first transport path. The plurality of driving sections correspond to the respective segments. The driving sections are configured to drive the first transport section in the corresponding segment. The drive transmission section is configured to drive the plurality of first transport sections based on an output from a predetermined one driving section while only the predetermined one driving section operates among the plurality of driving sections. The drive transmission section is configured to drive the plurality of first transport sections based on outputs from the corresponding driving sections while the plurality of driving sections operate.

With the constitution, the drive transmission section is configured to drive the plurality of first transport sections based on the output from the predetermined one driving section while only the predetermined one driving section operates among the plurality of driving sections. Operating the plurality of driving sections drives the plurality of first transport sections based on outputs from the corresponding driving sections. Accordingly, the relay transport apparatus can be switched to the one-motor drive or the multiple-motor drive depending on whether to operate only a predetermined one of the plurality of driving sections or to operate all the driving sections. The "motor" means the driving section.

The one-motor drive is advantageous of reduction in power consumption. The multiple-motor drive is advantageous of transportation at short paper intervals even if the paper sheets are comparatively long.

The relay transport apparatus of the present invention is configured as follows. The first transport sections each include a rotatably supported rotation shaft unit, a transport roller disposed at the rotation shaft unit, and a driven roller rotatable in contact with the transport roller. The predetermined one driving section corresponds to a first segment among the respective segments. The drive transmission section includes a first transmission section, a first one-way clutch, a second transmission section, and a second one-way clutch. The first transmission section is provided astride between the respective rotation shaft units adjacent along the first transport path. The first transmission section is configured to transmit rotation force between the respective rotation shaft units between which the first transmission section is provided astride. The first one-way clutch is disposed between the first transmission section and a first rotation shaft unit in a subsequent segment. The first transmission section is provided astride between a last rotation shaft unit in the segment and the first rotation shaft unit in the subsequent segment. The second transmission section is configured to transmit an output from each of the driving sections to the predetermined rotation shaft unit in the segment corresponding to the driving section. The second one-way clutch is disposed between the second transmission section and the predetermined rotation shaft unit in the segment other than the segment corresponding to the predetermined one driving section. The first one-way clutch is configured to transmit rotation force transmitted from the first transmission section to the first rotation shaft unit only while a rotation speed transmitted from the first transmission section to which the first one-way clutch is disposed is equal to or more than a rotation speed of the first rotation shaft unit to which the first one-way clutch is disposed. The second one-way clutch is configured to transmit rotation force transmitted from the second transmission section to the predetermined rotation shaft unit only while a rotation speed transmitted from the second transmission section to which the second one-way clutch is disposed is equal to or more than a rotation speed of the predetermined rotation shaft unit to which the second one-way clutch is disposed.

With the constitution, the drive transmission section that can switch the relay transport apparatus to the one-motor drive or the multiple-motor drive depending on whether to operate only a predetermined one of the plurality of driving sections or to operate all the driving sections can be constituted in a simple constitution.

In particular, the first and the second one-way clutches are equipped. This allows preventing an interference of outputs from the respective driving sections in the multiple-motor drive. In the one-motor drive, this allows preventing the stopped driving section from becoming braking force against the respective rotation shaft units.

The constitution of the first transport sections, the respective first transmission section, and the second transmission section provided astride between the predetermined one driving section, and the predetermined rotation shaft unit in the segment corresponding to the predetermined one driving section are the same as the constitution of conventional relay transport apparatuses dedicated for one-motor control (namely, the conventional relay transport apparatus). Therefore, the relay transport apparatus according to the present invention can be constituted utilizing the constitution of the conventional relay transport apparatus.

The relay transport apparatus of the present invention is configured as follows. At least one of the respective first transmission sections includes an intermediate rotation shaft unit, a first intermediate transmission section, and a second intermediate transmission section. The intermediate rotation shaft unit is disposed between the respective rotation shaft units between which the first transmission section is provided astride. The first intermediate transmission section is provided astride between one of the respective rotation shaft units and the intermediate rotation shaft unit. The first intermediate transmission section is configured to transmit rotation force between the one of the respective rotation shaft units and the intermediate rotation shaft unit. The second intermediate transmission section is provided astride between another of the respective rotation shaft units and the intermediate rotation shaft unit. The second intermediate transmission section is configured to transmit rotation force between the other of respective rotation shaft units and the intermediate rotation shaft unit.

With the constitution, the rotation force from the one rotation shaft unit is transmitted to the intermediate rotation shaft unit via the first intermediate transmission section and further is transmitted to the other rotation shaft unit via the second intermediate transmission section. Accordingly, dislocating the intermediate rotation shaft unit to the upward or downward of a virtual plane including the one and the other rotation shaft units allows flexing the transmission path for the rotation force at the intermediate rotation shaft unit. That is, a degree of freedom of provision of the transmission path for the rotation force can be improved.

The relay transport apparatus of the present invention is configured as follows. The drive transmission section further includes a third one-way clutch disposed between the first transmission section and a last rotation shaft unit in at least one segment among the respective segments. The first transmission section is provided astride between the last rotation shaft unit in the segment and the rotation shaft unit one prior to the last rotation shaft unit. The third one-way clutch is configured to transmit rotation force transmitted from the first transmission section to the last rotation shaft unit only while a rotation speed transmitted from the first transmission section to which the third one-way clutch is disposed is equal to or more than a rotation speed of the last rotation shaft unit to which the third one-way clutch is disposed.

With the constitution, in the case where the transport speed in the segment subsequent to the segment is faster than the transport speed in the segment, even if the paper sheet is transported across the last transport roller in the segment and the first transport roller in the subsequent segment, the third one-way clutch idles the last transport roller. This allows preventing the paper sheet from being tensioned due to the difference in the transport speeds. If the segment is the last segment, the subsequent segment is the post-processing apparatus.

The relay transport apparatus of the present invention is configured as follows. The other of the respective rotation shaft units is the last rotation shaft unit in the segment. The one of the respective rotation shaft units is the rotation shaft unit one prior to the last rotation shaft unit. The drive transmission section further includes a fourth one-way clutch disposed between one of the first and the second intermediate transmission sections and the intermediate rotation shaft unit. The fourth one-way clutch transmits rotation force between the first or the second intermediate transmission section to which the fourth one-way clutch is disposed and the intermediate rotation shaft unit only while a rotation speed of the one-prior-to rotation shaft unit is equal to or more than a rotation speed of the last rotation shaft unit.

With the constitution, in the case where the transport speed in the segment subsequent to the segment is faster than the transport speed in the segment, even if the paper sheet is transported across the last transport roller in the segment and the first transport roller in the subsequent segment, the fourth one-way clutch idles the last transport roller. This allows preventing the paper sheet from being tensioned due to the difference in the transport speeds. If the segment is the last segment, the subsequent segment is the post-processing apparatus.

The relay transport apparatus of the present invention is configured as follows. The relay transport apparatus includes a first input terminal and a second input terminal. The first input terminal is configured to input a drive signal from outside. The drive signal is configured to drive the predetermined one driving section. The second input terminal is configured to input a drive signal from outside. The drive signal is configured to drive the respective driving sections other than the predetermined one driving section.

With the constitution, when the control apparatus dedicated for one-motor control (the conventional control apparatus) is used as the predetermined control apparatus that controls the relay transport apparatus, it is only necessary to use the first input terminal. On the other hand, when the control apparatus that can perform the multiple-motor control is used, it is only necessary to use both the first and the second input terminals. That is, the present invention can support both the control apparatus dedicated for one-motor control and the control apparatus that can perform the multiple-motor control.

The relay transport apparatus of the present invention is configured as follows. The relay transport apparatus further includes a switching section and a first control section. The switching section is configured to switch a first mode and a second mode. The first mode is configured to drive the plurality of driving sections. The second mode is configured to drive only the predetermined one driving section. The first control section is configured to control the plurality of driving sections based on a switching result of the switching section.

With the constitution, the switching section and the first control section are equipped. This allows the relay transport apparatus to have the control function that switches the one-motor control and the multiple-motor control.

The relay transport apparatus of the present invention is configured as follows. The relay transport apparatus further includes a first detecting section configured to detect whether the paper sheet has passed the respective segments or not. When the paper sheet is carried in from the carry-in port to the first transport path at a first speed, the first control section in the first mode accelerates a transport speed of the plurality of first transport sections from the first speed to a second speed. When the first control section detects that a rear end of the paper sheet has passed the respective segments in the first transport path based on a detection result of the first detecting section, the first control section in the first mode drives the plurality of driving sections such that the transport speed of the first transport section in the passed segment is decelerated to the first speed.

With the constitution, in the first mode, when the rear end of the paper sheet has passed the respective segments in the first transport path, the transport speed of the first transport section in the passed segment is decelerated to the first speed. In view of this, before the paper sheet has completely passed the first transport path, the subsequent paper sheet can be carried in to the first transport path at the first speed. That is, the paper sheet can be transported at a shorter paper interval than the length of the first transport path. The transport speed is accelerated from the first transport speed to the second transport speed, this allows fast transportation.

The relay transport apparatus of the present invention is configured as follows. The relay transport apparatus further includes a first detecting section configured to detect whether the paper sheet has passed the respective segments or not. When the paper sheet is carried in from the carry-in port to the first transport path at a first speed, the control section in the second mode accelerates a transport speed of the plurality of first transport sections from the first speed to a second speed. When the control section detects that a rear end of the paper sheet has passed the first transport path based on a detection result of the first detecting section, the control section in the second mode drives only the predetermined one driving section such that the transport speed of the first transport section is decelerated to the first speed.

With the constitution, only the predetermined one driving section is driven, allowing reduction in power consumption. The transport speed is accelerated from the first transport speed to the second transport speed, this allows fast transportation.

The relay transport apparatus of the present invention is configured as follows. When the paper sheet is carried in from the carry-in port to the first transport path at a first speed, the first control section in the second mode drives only the predetermined one driving section such that a transport speed of the plurality of first transport sections becomes the first speed.

With the constitution, only the predetermined one driving section is driven, allowing reduction in power consumption. The paper sheet is transported at the same constant speed as the speed during transportation of the paper sheet (the first speed). This allows transportation the subsequent paper sheet at the first speed at desired timing regardless of the position of the paper sheet during transport on the first transport path. That is, the paper sheet can be transported at desired paper intervals.

The printing system of the present invention is configured as follows. The printing system includes the relay transport apparatus, an image forming apparatus, a post-processing apparatus, and a control apparatus. The relay transport apparatus is according to any one of the above-described inventions. The image forming apparatus is configured to form an image on a paper sheet. The image forming apparatus is configured to carry in the paper sheet from the carry-in port of the relay transport apparatus to the first transport path. The post-processing apparatus is configured to perform post-processing on the paper sheet carried out from the carry-out port of the relay transport apparatus. The control apparatus is configured to control the relay transport apparatus.

With the constitution, the printing system with the relay transport apparatus can be provided.

The printing system of the present invention is configured as follows. The control apparatus includes a switching section and a first control section configured to switch a first mode and a second mode. The first mode is configured to operate the plurality of driving sections. The second mode is configured to operate only the predetermined one driving section. The first control section is configured to control the plurality of driving sections based on a switching result of the switching section.

With the constitution, the control apparatus includes the switching section and the first control section. This allows switching the control on the relay transport apparatus between the one-motor control and the multiple-motor control.

The printing system of the present invention is configured as follows. The relay transport apparatus further includes a first detecting section. The first detecting section is configured to detect whether the paper sheet has passed the respective segments or not. When the paper sheet is carried in from the carry-in port to the first transport path at a first speed, the first control section in the first mode accelerates a transport speed of the plurality of first transport sections from the first speed to a second speed. When the first control section detects that a rear end of the paper sheet has passed the respective segments in the first transport path based on a detection result of the first detecting section, the first control section in the first mode drives the plurality of driving sections such that the transport speed of the first transport section in the passed segment is decelerated to the first speed.

With the constitution, in the first mode, when the rear end of the paper sheet has passed the respective segments in the first transport path, the transport speed of the first transport section in the passed segment is decelerated to the first speed. In view of this, before the paper sheet has completely passed the first transport path, the subsequent paper sheet can be carried in to the first transport path at the first speed. That is, the paper sheet can be transported at a shorter paper interval than the length of the first transport path. The transport speed is accelerated from the first transport speed to the second transport speed, this allows fast transportation.

The printing system of the present invention is configured as follows. The printing system further includes a first detecting section. The first detecting section is configured to detect whether the paper sheet has passed the respective segments or not. When the paper sheet is carried in from the carry-in port to the first transport path at a first speed, the first control section in the second mode accelerates a transport speed of the plurality of first transport sections from the first speed to a second speed. When the first control section detects that a rear end of the paper sheet has passed the first transport path based on a detection result of the first detecting section, the first control section in the second mode drives only the predetermined one driving section such that the transport speed of the first transport section is decelerated to the first speed.

With the constitution, only the predetermined one driving section is driven, allowing reduction in power consumption. The transport speed is accelerated from the first transport speed to the second transport speed, this allows fast transportation.

The printing system of the present invention is configured as follows. When the paper sheet is carried in from the carry-in port to the first transport path at a first speed, the first control section drives only the predetermined one driving section in the second mode such that a transport speed of the plurality of first transport sections becomes the first speed.

With the constitution, only the predetermined one driving section is driven, allowing reduction in power consumption. The paper sheet is transported at the same constant speed as the speed during transportation of the paper sheet (the first speed). This allows transportation of the subsequent paper sheet at the first speed at desired timing regardless of the position of the paper sheet during transport on the first transport path. That is, the paper sheet can be transported at desired paper intervals.

The printing system of the present invention is configured as follows. The image forming apparatus includes a second detecting section. The second detecting section is configured to detect a length of the paper sheet in a transport direction. When a detection result of the second detecting section is equal to or more than a predetermined reference length, the switching section switches a mode to the first mode. When the detection result of the second detecting section is less than the predetermined reference length, the switching section switches the mode to the second mode.

With the constitution, according to the length of the paper sheet in the transport direction, the control on the relay transport apparatus can be switched between the first mode and the second mode.

The printing system of the present invention is configured as follows. The image forming apparatus includes a plurality of sheet feed cassettes, a plurality of extraction sections, a second transport path, a second transport section, an acquiring section, and a second control section. The sheet feed cassettes are configured to supply paper sheets with different paper sheet sizes. The plurality of extraction sections are disposed at the respective sheet feed cassettes. The extraction sections are configured to take the paper sheets out from the sheet feed cassettes at which the extraction sections are disposed. The second transport path couples the respective sheet feed cassettes and the carry-in port of the relay transport apparatus. The second transport section is configured to transport the paper sheets taken out from the respective sheet feed cassettes to the carry-in port along the second transport path. The acquiring section is configured to acquire information on a paper sheet size of a paper sheet taken out. The second control section is configured to control the extraction section disposed at the sheet feed cassette for a paper sheet size corresponding to an acquisition result of the acquiring section so as to take a paper sheet out from the sheet feed cassette. The second detecting section is configured to detect a length of the paper sheet in a transport direction based on the acquisition result of the acquiring section.

With the constitution, based on the acquisition result of the acquiring section, the length of the paper sheet in the transport direction is detected. This allows detecting the length of the paper sheet in the transport direction utilizing the existing constitution.

The printing system of the present invention is configured as follows. The image forming apparatus includes a sheet feed cassette, a second transport path, a second transport section, a speed detecting section, and a time detecting section. The sheet feed cassette is configured to supply a paper sheet. The second transport path couples the sheet feed cassette and the carry-in port of the relay transport apparatus. The second transport section is configured to transport the paper sheet in the sheet feed cassette to the carry-in port along the second transport path. The speed detecting section is configured to detect a passing speed that the paper sheet passes a predetermined position of the second transport path. The time detecting section is configured to detect passing time from when a front end of the paper sheet passes the predetermined position until a rear end of the paper sheet passes the predetermined position. The second detecting section is configured to detect a length of the paper sheet in a transport direction based on the passing speed and the passing time.

With the constitution, based on the passing speed and the passing time, the length of the paper sheet in the transport direction is detected. Accordingly, even if the paper sheets with the size other than the specified size are stacked on the sheet feed cassettes, the lengths of the paper sheets in the transport direction can be accurately detected.

The printing system of the present invention is configured as follows. The image forming apparatus includes a sheet feed cassette, a transfer section, a pair of fixing rollers, a second transport path, and a second transport section. The sheet feed cassette is configured to supply a paper sheet. The transfer section is configured to transfer a toner image on the paper sheet. The pair of fixing rollers are configured to pressurize and heat the paper sheet on which the toner image has been transferred between the pair of fixing rollers for fixation. The second transport path is configured to reach the carry-in port of the relay transport apparatus from the sheet feed cassette via the transfer section and the fixing roller sequentially. The second transport section is configured to transport the paper sheet in the sheet feed cassette to the carry-in port along the second transport path. The predetermined reference length is a length between the fixing roller and the first transport section disposed first in the relay transport apparatus in the second transport path.

With the constitution, the predetermined reference length is set at the length between the fixing roller and the first transport section of the relay transport apparatus in the second transport path. This allows controlling the relay transport apparatus in the first mode only for a paper sheet that can be transported at high speed and short paper interval only in the first mode (the multiple-motor control) all anyhow. For paper sheets other than such paper sheet, this allows controlling the relay transport apparatus in the second mode (namely, the one-motor control). That is, this allows controlling the relay transport apparatus by control emphasizing reduction in power consumption.

The printing system of the present invention is configured as follows. The post-processing apparatus includes a post-processing section and a determining section. The post-processing section is configured to perform predetermined post-processing on the paper sheet from the relay transport apparatus. The determining section is configured to determine whether to perform the predetermined post-processing on the paper sheet from the relay transport apparatus or not. When the determining section determines execution of the predetermined post-processing on the paper sheet, the switching section switches a mode to the first mode. When the determining section determines not to perform the predetermined post-processing on the paper sheet, the switching section switches the mode to the second mode.

With the constitution, this allows switching the control on the relay transport apparatus between the first mode and the second mode depending on whether to perform the predetermined the post-processing on the paper sheet from the relay transport apparatus or not. The predetermined post-processing may be processing, for example, that aligns and binds the paper sheets by a plurality of sheets.

The printing system of the present invention is configured as follows. The relay transport apparatus further includes a first input terminal and a second input terminal. The first input terminal is configured to input a first drive signal. The first drive signal is configured to drive the predetermined one driving section. The second input terminal is configured to input a second drive signal. The second drive signal is configured to drive the respective driving sections other than the predetermined one driving section. The control apparatus further includes a first output terminal and a second output terminal. The first output terminal is attachably/detachably coupled to the first input terminal. The first output terminal is configured to output the first drive signal to the first input terminal. The second output terminal is attachably/detachably coupled to the second input terminal. The second output terminal is configured to output the second drive signal to the second input terminal. The first control section is configured to output the first drive signal from the first output terminal when driving only the predetermined one driving section. The first control section being configured to output the first and the second drive signals from the first and the second output terminals when driving the plurality of driving sections.

With the constitution, the printing system in combination with the relay transport apparatus with the first and the second input terminals and the control apparatus with the first and the second output terminals can be provided.

The printing system of the present invention is configured as follows. The relay transport apparatus further includes a first input terminal and a second input terminal. The first input terminal is configured to input a first drive signal. The first drive signal is configured to drive the predetermined one driving section. The second input terminal is configured to input a second drive signal. The second drive signal is configured to drive the respective driving sections other than the predetermined one driving section. The control apparatus includes an output terminal and a third control section. The output terminal is attachably/detachably coupled to the first input terminal. The output terminal is configured to output the first drive signal to the first input terminal. The third control section is configured to output the first drive signal from the output terminal. The third control section is configured to drive the predetermined one driving section.

With the constitution, the printing system in combination with the relay transport apparatus with the first and the second input terminals and the control apparatus with the first output terminal only can be provided.

The printing system of the present invention is configured as follows. The control apparatus is mounted to the post-processing apparatus.

With the constitution, the control apparatus is mounted to the post-processing apparatus. This allows integrating the control apparatus with the control section in the post-processing apparatus, allowing a simple constitution. To control the relay transport apparatus according to contents of the post-processing by the post-processing apparatus, mounting the control apparatus to the post-processing apparatus allows deploying the processing and control relating to one another at one location concentratedly, simplifying design.

Advantageous Effects of Invention

With the relay transport apparatus and the printing system of the present invention, the drive transmission section is configured to drive the plurality of first transport sections based on the output from the predetermined one driving section when only the predetermined one driving section operates among the plurality of driving sections. Operating the plurality of driving sections drives the plurality of first transport sections based on outputs from the corresponding driving sections. Accordingly, the relay transport apparatus can be switched to the one-motor drive or the multiple-motor drive depending on whether to operate only a predetermined one of the plurality of driving sections or to operate all the driving sections.

DESCRIPTION OF EMBODIMENTS

A detailed description of embodiments of the present invention will be given below with reference to the accompanying drawings.

First Embodiment

Overall Configuration

Figure 1:
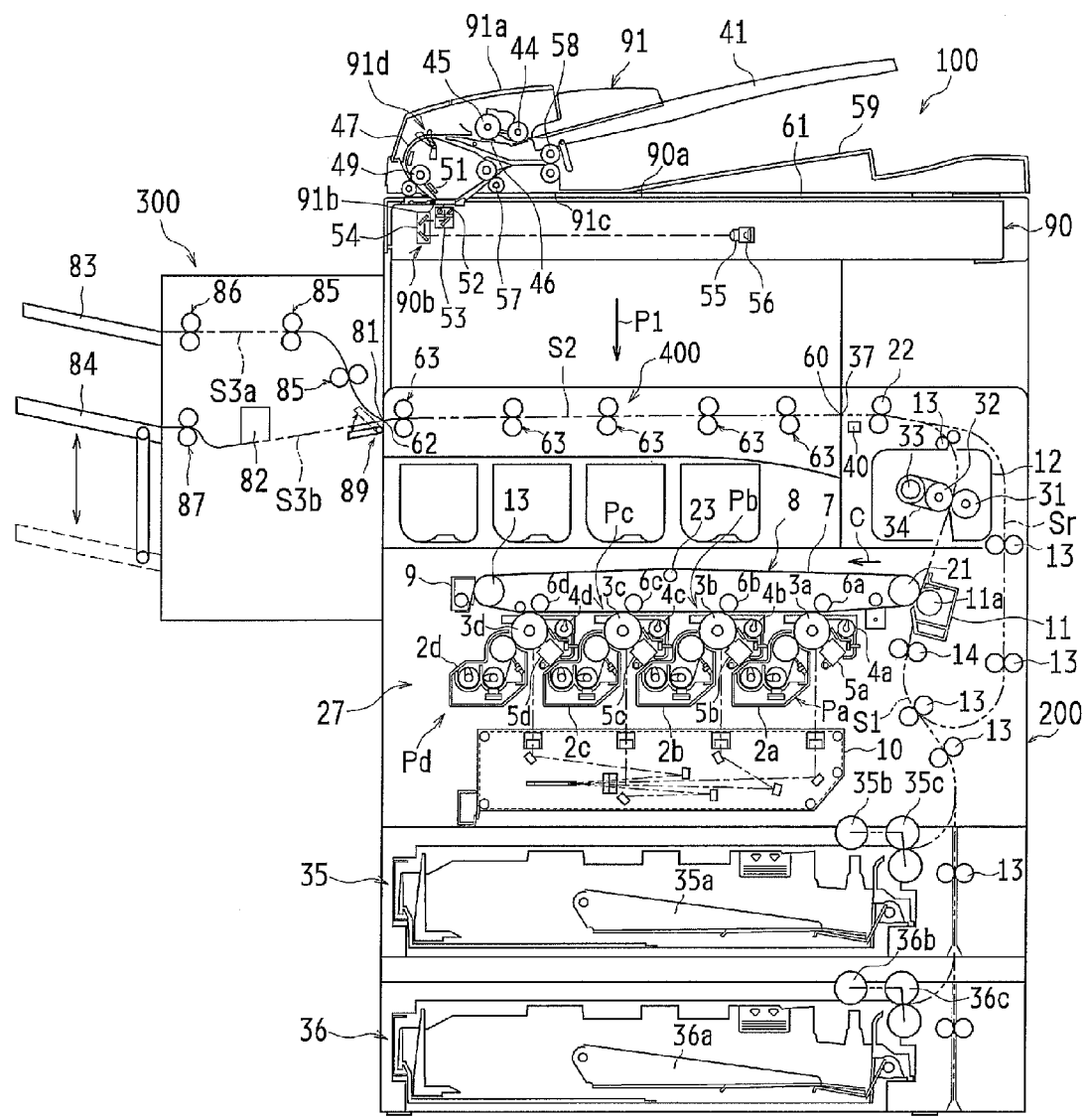
FIG. 1 is a cross-segmental schematic diagram illustrating an exemplary printing system according to a first embodiment.
Figure 2:
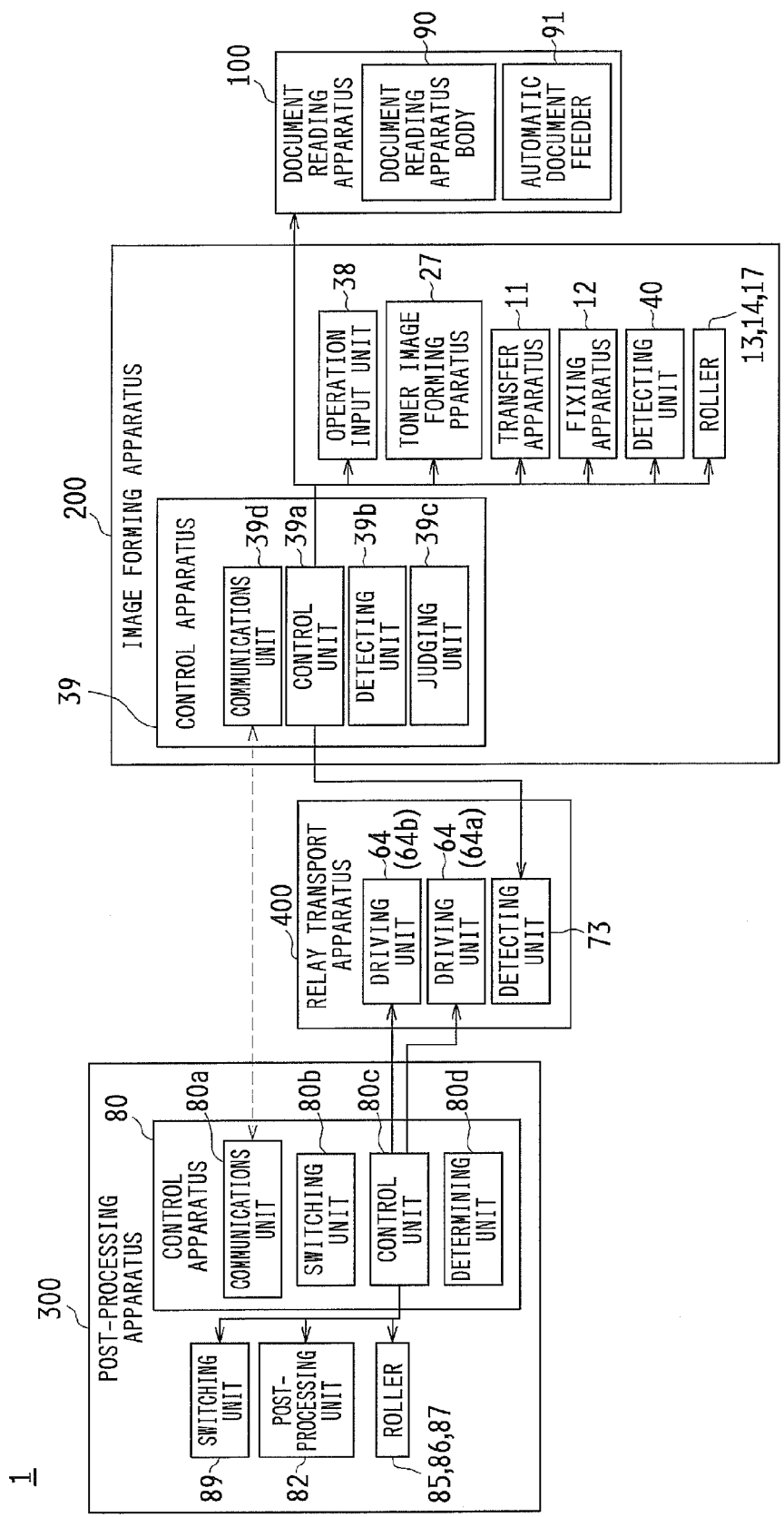
FIG. 2 is a schematic block diagram of the printing system illustrated in FIG. 1.

FIG. 1 is a cross-segmental schematic diagram illustrating a printing system according to a first embodiment of the present invention. FIG. 2 is a schematic block diagram of the printing system illustrated in FIG. 1.

A printing system 1 obtains image information and prints and records an image shown by the obtained image information on a recording paper sheet (a paper sheet). This printing system 1, as illustrated in FIG. 1, includes a document reading apparatus 100, an image forming apparatus 200, a post-processing apparatus 300, and a relay transport apparatus 400. The document reading apparatus 100 reads an image on a document. The image forming apparatus 200 forms the image read by the document reading apparatus 100 on the recording paper sheet. The post-processing apparatus 300 performs post-processing on the recording paper sheet on which the image is formed by the image forming apparatus 200. The relay transport apparatus 400 transports the recording paper sheet carried out from the image forming apparatus 200 to the post-processing apparatus 300.

Here, the following describes a method for obtaining image information with the case where the image information is obtained using the document reading apparatus 100; however, this should not be constructed in a limiting sense. For example, the image information may be obtained from an outside though communications.

Here, the image forming apparatus 200 includes a control apparatus 39 while the post-processing apparatus 300 includes a control apparatus 80 (see FIG. 2). The control apparatus 39 controls the document reading apparatus 100 and the image forming apparatus 200. The control apparatus 80 communicates with the control apparatus 39 and controls the post-processing apparatus 300 and the relay transport apparatus 400 together with operations of the document reading apparatus 100 and the image forming apparatus 200.

In this printing system 1, for example, as illustrated in FIG. 1, the image forming apparatus 200 is installed on a surface of a floor. The relay transport apparatus 400 is installed upward of the image forming apparatus 200. The document reading apparatus 100 is installed upward of the relay transport apparatus 400. The post-processing apparatus 300 is installed at a side surface of the relay transport apparatus 400.

In this printing system 1, a control system of the relay transport apparatus 400 can be switched between one-motor control (a second mode) and multiple-motor control (a first mode). The control system is switched according to, for example, presence/absence of post-processing by the post-processing apparatus 300 and a length of the recording paper sheet employed for print and recording in a transport direction.

<Document Reading Apparatus 100>

The document reading apparatus 100 reads images, for example, based on control by the control apparatus 39 of the image forming apparatus 200. The document reading apparatus 100, as illustrated in FIG. 1, includes a document reading apparatus body 90 and an automatic document feeder 91. The document reading apparatus body 90 reads an image on a document. The automatic document feeder 91 transports the document to the document reading apparatus body 90. The document reading apparatus body 90 is installed upward of the relay transport apparatus 400. The automatic document feeder 91 is installed upward of the document reading apparatus body 90.

A part of a peripheral edge of a lower surface 91c is turnably coupled to a predetermined position at a top surface of the document reading apparatus body 90. Thus, the automatic document feeder 91 is installed on the body of the document reading apparatus 100. Accordingly, the automatic document feeder 91 functions as a cover body that openably covers a predetermined region of the top surface of the document reading apparatus body 90 (a document reading region described below).

The automatic document feeder 91 includes a housing 91a. At the lower surface 91c of the housing 91a, an opening 91b is formed. At the outside of the housing 91a, a document set tray 41 and a discharge tray 59 are disposed. A document is placed on the document set tray 41. The document is discharged to the discharge tray 59. The document set tray 41 is disposed at the upper stage side of the housing 91a. The discharge tray 59 is disposed at the lower stage side of the housing 91a.

At the inside of the housing 91a, an automatic document feeder body 91d is disposed. The automatic document feeder body 91d picks up the document inside of the document set tray 41 one by one and causes the document to pass on the opening 91b and discharges the document to the discharge tray 59.

The automatic document feeder body 91d includes a transport path 47, a pickup roller 44, a separation roller 45, a separation pad 46, a registration roller 49, a reading guide 51, a transport roller 57, and a discharge roller 58. The transport path 47 extends from the document set tray 41 to the discharge tray 59 via the right above the opening 91b. The pickup roller 44 takes out the document from the document set tray 41. The separation roller 45 and the separation pad 46 separate the taken out document one by one. The registration roller 49 aligns an orientation of the top of the document. The reading guide 51 guides the document to the right above the opening 91b. The transport roller 57 and the discharge roller 58 transport the document to the discharge tray 59 side. The separation pad 46 is arranged in contact with the separation roller 45.

The document reading apparatus body 90 includes the document reading region at a top surface 90a. The document reading region includes a first reading region and a second reading region. A reading glass 52 is disposed at the first reading region, and a platen glass 61 is disposed at the second reading region.

The first reading region (that is, the region where the reading glass 52 is disposed) is a region for reading the document transported by the automatic document feeder body 91d. The first reading region is formed opposed to the opening 91b of the automatic document feeder 91. The second reading region (that is, the region where the platen glass 61 is disposed) is a region for reading the document placed on the platen glass 61.

The document reading apparatus body 90 includes a reading apparatus 90b to read the image on the document. The reading apparatus 90b includes a first scanning unit 53, a second scanning unit 54, an image forming lens 55, an imaging device 56 such as a Charge Coupled Device (CCD), and a scanning and moving mechanism (not illustrated). The scanning and moving mechanism scans and moves the first and the second scanning units 53 and 54.

The first scanning unit 53 includes a light source and a reflecting portion (for example, a mirror). The light source irradiates light on the document. The reflecting portion reflects reflected light reflected by the document by the light to the second scanning unit 54. The second scanning unit 54 includes a reflecting portion (for example, a mirror). The reflecting portion reflects the reflected light from the first scanning unit 53 and forms an image on the imaging device 56 via the image forming lens 55.

When the document from the automatic document feeder 91 is read, the scanning and moving mechanism causes the first scanning unit 53 to locate at the right below the reading glass 52.

When the document placed on the platen glass 61 is read, the scanning and moving mechanism causes the first scanning unit 53 to locate at the right below the platen glass 61 and to move in a predetermined direction along the platen glass 61.

Then, the scanning and moving mechanism causes the first and the second scanning units 53 and 54 to mutually maintain a predetermined speed relationship. The scanning and moving mechanism also moves the second scanning unit 54 so that a length of an optical path of the reflected light reflected by the document by the light from the first scanning unit 53 (that is, an optical path of the reflected light of the surface of document to the first and the second scanning units 53 and 54 to the image forming lens 55 to the imaging device 56) may not change. This always maintains a focus of the image on the document on the imaging device 56 precisely.

(Operations by Document Reading Apparatus 100)

The following describes operations of the document reading apparatus 100. First, the following describes an operation of reading a document from the automatic document feeder 91.

When the document is set at the document set tray 41, the pickup roller 44 extracts the document from the document set tray 41. Then, the document passes through between the separation roller 45 and the separation pad 46, is separated one by one, and is transported to the transport path 47. Then, the registration roller 49 transports the document, the document passes though between the reading guide 51 and the reading glass 52 (namely, on the opening 91b), and the transport roller 57 and the discharge roller 58 transport the document to the discharge tray 59 for discharge.

Then (that is, when the document passes through on the opening 91b), light of the light source from the first scanning unit 53 is irradiated on the surface of the document via the reading glass 52. Then, the reflected light enters the first scanning unit 53 via the reading glass 52, the reflected light is reflected by the reflecting portions of the first and the second scanning units 53 and 54, thus an image is formed on the imaging device 56 via the image forming lens 55. Then, the imaging device 56 reads the image (namely, the image on the document).

The following describes an operation of reading the document placed on the platen glass 61.

The automatic document feeder 91, which is a cover body, is opened, the document is placed on the platen glass 61, and the cover body is closed. When an operation of starting reading is input to an operation input unit 38, which will be described later, the reading apparatus 90b reads the document on the platen glass 61.

That is, the first and the second scanning units 53 and 54 move in a sub-scanning direction. The first scanning unit 53 exposes the surface of the document on the platen glass 61. The first and the second scanning units 53 and 54 reflect the reflected light, thus the image is formed on the imaging device 56 via the image forming lens 55. Then, the imaging device 56 reads the image (namely, the image on the document).

The image thus read is transmitted from the imaging device 56 to the image forming apparatus 200 as image data.

<Image Forming Apparatus 200>

The image forming apparatus 200 prints and records the image read by the document reading apparatus 100 on the recording paper sheet. The image forming apparatus 200, as illustrated in FIG. 1, includes a plurality of sheet feed cassettes 35 and 36, a toner image forming apparatus 27, a secondary transfer apparatus (hereinafter referred to as a transfer apparatus) 11, a fixing apparatus 12, a transport path S1 (a second transport path), the operation input unit 38, and the control apparatus 39. The sheet feed cassettes 35 and 36 supply the recording paper sheets of respective different paper sheet sizes. The toner image forming apparatus 27 forms a toner image that reproduces the image read by the document reading apparatus 100. The transfer apparatus 11 transfers the toner image formed by the toner image forming apparatus 27 on the recording paper sheet. The fixing apparatus 12 fixes the toner image transferred by the transfer apparatus 11 on the recording paper sheet. The transport path S1 sequentially transports the recording paper sheet supplied from the sheet feed cassettes 35 and 36 to the relay transport apparatus 400 via the transfer apparatus 11 and the fixing apparatus 12. The operation input unit 38 receives an operation input by a user. The control apparatus 39 controls the transfer apparatus 11, the fixing apparatus 12, and the toner image forming apparatus 27 according to the operation input to the operation input unit 38 and controls the document reading apparatus 100 as described above.

<Toner Image Forming Apparatus 27>

The toner image forming apparatus 27 superimposes toner images with four basic colors, which are, for example, a black (K), a cyan (C), a magenta (M), and a yellow (Y) to reproduce the image read by the document reading apparatus 100.

The toner image forming apparatus 27, as illustrated in FIG. 1, includes four image stations Pa, Pb, Pc, and Pd corresponding to the respective colors of K, C, M, and Y, a light scanning apparatus 10, and an intermediate transfer belt apparatus 8.

The image stations Pa, Pb, Pc, and Pd form toner images with the colors of K, C, M, and Y, respectively. The image stations Pa, Pb, Pc, and Pd include respective development apparatuses 2a, 2b, 2c, and 2d, respective photosensitive drums 3a, 3b, 3c, and 3d, respective drum cleaning apparatuses 4a, 4b, 4c, and 4d, and respective charging units 5a, 5b, 5c, and 5d.

The photosensitive drums 3a, 3b, 3c, and 3d each have a light photosensitive layer at the surface. The charging units 5a, 5b, 5c, and 5d uniformly charge the surfaces of the photosensitive drums 3a, 3b, 3c, and 3d to a predetermined electric potential, respectively.

The light scanning apparatus 10 irradiates a light on the surfaces of the respective charged photosensitive drums 3a, 3b, 3c, and 3d based on the image data to form respective electrostatic latent images corresponding to the image data on the surfaces. The development apparatuses 2a, 2b, 2c, and 2d develop the electrostatic latent images formed on the surfaces of the respective photosensitive drums 3a, 3b, 3c, and 3d with toners with the respective colors. Thus, the toner images with the respective colors are formed on the surfaces of the respective photosensitive drums 3a, 3b, 3c, and 3d.

The respective drum cleaning apparatuses 4a, 4b, 4c, and 4d remove and recover toners remaining on the surfaces of the respective photosensitive drums 3a, 3b, 3c, and 3d.

The intermediate transfer belt apparatus 8 superimposes the toner images with the respective colors formed by the respective image stations Pa, Pb, Pc, and Pd to form toner images reproducing the image. The intermediate transfer belt apparatus 8 includes an intermediate transfer belt 7, an intermediate transfer belt drive roller 21, a driven roller 22, respective intermediate transfer rollers 6a, 6b, 6c, and 6d, and a belt cleaning apparatus 9.

The intermediate transfer belt 7 has an endless belt shape. The intermediate transfer belt 7 is stretched and supported by the intermediate transfer belt drive roller 21, the driven roller 22, and the respective intermediate transfer rollers 6a, 6b, 6c, and 6d. Rotatably driving the intermediate transfer belt drive roller 21 circularly moves the intermediate transfer belt 7, for example, in the direction of an arrow C.

The respective intermediate transfer rollers 6a, 6b, 6c, and 6d transfer the toner images formed on the surfaces of the respective photosensitive drums 3a, 3b, 3c, and 3d to the intermediate transfer belt 7, respectively. The respective intermediate transfer rollers 6a, 6b, 6c, and 6d are rotatably supported so as to be pressed to the respective photosensitive drums 3a, 3b, 3c, and 3d via the intermediate transfer belt 7, respectively.

In this intermediate transfer belt apparatus 8, rotatably driving the intermediate transfer belt drive roller 21 circularly moves the intermediate transfer belt 7. In association with this, the respective photosensitive drums 3a, 3b, 3c, and 3d are rotated. In association with this, the toner images on the surfaces of the respective photosensitive drums 3a, 3b, 3c, and 3d are sequentially pressed, superimposed, and transferred to the intermediate transfer belt 7.

Here, a transfer bias is applied to the surfaces of the respective intermediate transfer rollers 6a, 6b, 6c, and 6d. The transfer bias transfers the toner images by electrostatic attractive force. Accordingly, when the toner images on the surfaces of the respective photosensitive drums 3a, 3b, 3c, and 3d are pressed to the intermediate transfer belt 7, the electrostatic attractive force transfers the toner images on the surfaces of the respective photosensitive drums 3a, 3b, 3c, and 3d to the intermediate transfer belt 7.

Thus, the toner images reproducing the image are formed on the intermediate transfer belt 7. Then, the circular movement of the intermediate transfer belt 7 transports the toner images thus formed on the intermediate transfer belt 7 to the transfer apparatus 11. The transfer apparatus 11 transfers the toner images on the recording paper sheet.

The belt cleaning apparatus 9 removes and recovers residual toner on the surface of the intermediate transfer belt 7.

<Transfer Apparatus 11>

The transfer apparatus 11 transfers the toner images formed on the surface of the intermediate transfer belt 7 to the recording paper sheet. As illustrated in FIG. 1, the transfer apparatus 11 includes a secondary transfer roller 11a. The secondary transfer roller 11a is rotatably supported so as to be pressed to the intermediate transfer belt drive roller 21 via the intermediate transfer belt 7.

In association with the circular movement of the intermediate transfer belt 7, the secondary transfer roller 11a of the transfer apparatus 11 is rotated. Matching the timing of when the toner images on the surface of the intermediate transfer belt 7 are pressed to the secondary transfer roller 11a, the recording paper sheet supplied from a sheet feed cassette 18 is carried in to a pressing region (a nip region), which is disposed between the intermediate transfer belt 7 and the secondary transfer roller 11a. Thus, the toner images formed on the surface of the intermediate transfer belt 7 are transferred to the recording paper sheet.

Here, a transfer bias is applied to the surface of the secondary transfer roller 11a. The transfer bias transfers the toner images by electrostatic attractive force. Accordingly, when the toner images on the surface of the intermediate transfer belt 7 are pressed to the recording paper sheet at the nip region, which is disposed between the intermediate transfer belt 7 and the secondary transfer roller 11a, the electrostatic attractive force transfers the toner images on the surface of the intermediate transfer belt 7 to the recording paper sheet.

<Fixing Apparatus 12>

The fixing apparatus 12 fixes the toner images transferred by the transfer apparatus 11 on the recording paper sheet. The fixing apparatus 12, for example, is a belt fixing system. The fixing apparatus 12, as illustrated in FIG. 1, includes a pressing roller 31, a fixing roller 32, a heating roller 33, and a fixing belt 34.

Here, the pressing roller 31 and the fixing roller 32 constitute a pair of fixing rollers.

The fixing roller 32 is rotatably supported so as to be pressed to the pressing roller 31 via the fixing belt 34. The heating roller 33 internally includes a heater lamp (for example, a halogen lamp (not illustrated)) as a heat source to heat the heating roller 33.

Among the respective rollers 31, 32, and 33, for example, one roller (for example, the pressing roller 31) is a drive roller rotatably driven by a predetermined motor. Other rollers (for example, the fixing roller 32 and the heating roller 33) are driven rollers rotated in association with rotation of the drive roller.

The fixing belt 34 is an endless belt made of a material with good heat conduction. The fixing belt 34 is stretched and supported by the fixing roller 32 and the heating roller 33. Rotatably driving the pressing roller 31 circularly moves the fixing belt 34.

In this fixing apparatus 12, rotatably driving the pressing roller 31 accordingly rotates the fixing roller 32 and circularly moves the fixing belt 34. In association with this circular movement, the heating roller 33 is rotated.

At this time, the fixing belt 34 circularly moves via the nip region (the pressing region between the pressing roller 31 and the fixing roller 32) while being heated by the heating roller 33, thus heating the nip region by the fixing belt 34. Then, when the recording paper sheet is transported through the nip region, the fixing belt 34 and the pressing roller 31 heat and pressurize the recording paper sheet. Thus, the toner images on the recording paper sheet are fixed to the recording paper sheet. The recording paper sheet on which the toner images have been fixed is carried out from the fixing apparatus 12, transported to a carry-out port 37 along the transport path S1, and is carried out from the carry-out port 37 to the relay transport apparatus 400.

<Sheet Feed Cassettes 35 and 36>

The respective sheet feed cassettes 35 and 36, as illustrated in FIG. 1, for example, are vertically arranged at the lower portion of an image forming apparatus 1.

The sheet feed cassettes 35 and 36 include sheet feed cassette bodies 35a and 36a, pickup rollers 35b and 36b (extraction units), and transport rollers 35c and 36c, respectively. The recording paper sheets are placed at the sheet feed cassettes 35 and 36. The pickup rollers 35b and 36b pick up the recording paper sheets one by one from the sheet feed cassette bodies 35a and 36a and supplies the recording paper sheets to the transport path S1. The transport rollers 35c and 36c carry out the recording paper sheets taken out by the pickup rollers 35b and 36b to the transport path S1.

Here, at the sheet feed cassette 35, the recording paper sheets with paper sheet size whose length in the transport direction is longer than a predetermined reference length are placed. At the sheet feed cassette 36, the recording paper sheets with paper sheet size whose length in the transport direction is less than the predetermined reference length are placed.

The predetermined reference length, for example, is a length between the fixing roller 32 in the transport path S1 of the image forming apparatus 200 and the first transport roller 63 among the respective transport rollers 63 of the relay transport apparatus 400.

<Transport Path S1>

The transport path S1, as illustrated in FIG. 1, is formed so that the recording paper sheets from the respective sheet feed cassettes 35 and 36 are sequentially transported to the transfer apparatus 11, the fixing apparatus 12, and the carry-out port 37. That is, the transport path S1 is formed so as to couple the respective sheet feed cassettes 35 and 36 and the carry-out port 37 via the transfer apparatus 11 and the fixing apparatus 12.

At the transport path S1, a registration roller 14 (the second transport unit), respective transport rollers 13 (the second transport units), and a carry-out roller 17 (a second transport unit) are arranged.

At a side of carrying out the paper sheet at the carry-out roller 17, a detecting unit 40 is disposed. The detecting unit 40 detects whether the recording paper sheet is completely carried out from the image forming apparatus 200 or not (that is, whether the rear end of the recording paper sheet has passed the carry-out roller 17 or not). The detecting unit 40, for example, includes an optical photo sensor. This optical photo sensor detects whether or not the rear end of the recording paper sheet has passed the detecting unit 40, so as to detect whether or not the rear end of the recording paper sheet has passed the carry-out roller 17.

The transport roller 13 is a small-sized roller for transporting the recording paper sheets. The plurality of transport rollers 13 are arranged along the transport path S1.

The pair of registration rollers 14 are arranged near the transfer apparatus 11 at a side where the paper sheets are carried in. The registration rollers 14 once stop the transported recording paper sheet. The registration rollers 14 carry in the recording paper sheet to the transfer apparatus 11 in accordance with the rotation of the intermediate transfer belt 7 so that the toner images on the intermediate transfer belt 7 is transferred on the recording paper sheet.

The carry-out roller 17 is arranged, for example, at the front side of the carry-out port 37. The carry-out roller 17 transports the recording paper sheet carried out from the fixing apparatus 12 to the carry-out port 37 (that is, the relay transport apparatus 400).

The recording paper sheet supplied from the sheet feed cassettes 35 and 36 are transported along the transport path S1 through the transfer apparatus 11 and the fixing apparatus 12. Thus, the image is printed and recorded on the surface of the recording paper sheet.

This transport path S1 includes an inverting path Sr for printing and recording the image on a back surface of the recording paper sheet. The inverting path Sr is formed so as to couple, for example, a predetermined position at a paper sheet carry-in side of the carry-out roller 17 (a first predetermined position) and a predetermined position at a carry-in side of the registration roller 14 (a second predetermined position) in the transport path S1. The inverting path Sr includes the plurality of transport rollers 13 for transporting the recording paper sheets along the inverting path Sr.

To print and record the image on both surfaces of the recording paper sheet, after the fixing apparatus 12 fixes the image on the surface of the recording paper sheet, the carry-out roller 17 transports the recording paper sheet along the transport path S1. When the recording paper sheet passes through the first predetermined position, the carry-out roller 17 is inversely rotated. Thus, the recording paper sheet is carried in from the first predetermined position to the inverting path Sr.

Then, transporting the recording paper sheet to the registration roller 14 along the inverting path Sr inverts the front and back of the recording paper sheet. Similarly to the printing and recording of the front surface, this inverted recording paper sheet is sequentially passed through the transfer apparatus 11 and the fixing apparatus 12, thus the image is printed and recorded to the back surface of the recording paper sheet. This prints and records the image on both surfaces of the recording paper sheet.

<Control Apparatus 39>

The control apparatus 39, as illustrated in FIG. 2, includes a control unit 39a (a second control unit), a detecting unit 39b (a second detecting unit), a judging unit 39c, and a communications unit 39d. The control unit 39a controls the document reading apparatus 100 and the image forming apparatus 200 according to the input operation to the operation input unit 38. The detecting unit 39b detects a paper sheet size of the recording paper sheet used for printing and recording. The judging unit 39c judges whether the length of the recording paper sheet in the transport direction is equal to or more than the predetermined reference length or not based on the detection result by the detecting unit 39b. The communications unit 39d performs wired communications or wireless communications with the post-processing apparatus 300.

When the paper sheet size is selected by the input operation to the operation input unit 38, the detecting unit 39b detects the paper sheet size of the recording paper sheet used for the printing and recording based on the selection.

Since the operation input unit 38 receives a setting input of the paper sheet sizes (that is, the length of the recording paper sheet in the transport direction) of the recording paper sheets used for printing and recording (that is, the recording paper sheets taken out from the sheet feed cassettes 35 and 36). Accordingly, the operation input unit 38 functions as an acquiring unit that obtains information on the recording paper sheets taken out from the sheet feed cassettes 35 and 36.

The detecting unit 39b detects the length of the recording paper sheet in the transport direction based on the result obtained by the acquiring unit (here, the operation input unit 38). Accordingly, the detecting unit 39b can detect the paper sheet size (that is, the length of the recording paper sheet in the transport direction) utilizing the existing constitution (namely, the acquiring unit).

The judging unit 39c judges whether the length of the recording paper sheet in the transport direction used for printing and recording is equal to or more than the predetermined reference length or not based on the detection result by the detecting unit 39b.

When a document is set at the document set tray 41 of the document reading apparatus 100, the control unit 39a detects the state by, for example, a predetermined paper sheet detecting sensor disposed at the document set tray 4. In this state, when an operation of starting reading is input to the operation input unit 38, the control unit 39a causes the document reading apparatus 100 to drive as described above and read the image on the document set at the document set tray 41.

When a document is set at the platen glass 61 of the document reading apparatus 100, the control unit 39a detects the state by, for example, the predetermined paper sheet detecting sensor disposed at the document reading apparatus body 90. In this state, when an operation of starting reading is input to the operation input unit 38, the control unit 39a causes the document reading apparatus 100 to drive as described above and read the image on the document set at the platen glass 61.

Then, the control unit 39a causes the toner image forming apparatus 27 to output the image data of the image read by the document reading apparatus 100. The control unit 39a causes the toner image forming apparatus 27 to drive and form the toner image reproducing the image.

Concurrently, the control unit 39a causes the pickup rollers 35b and 36b disposed at the sheet feed cassettes 35 and 36 with the paper sheet sizes corresponding to the detection result by the detecting unit 39b to drive. Then, the control unit 39a causes the pickup rollers 35b and 36b to pick up the recording paper sheets with the paper sheet sizes used for printing and recording from the respective sheet feed cassettes 35 and 36.

Then, the control unit 39a causes the transport rollers 35c and 36c disposed at the sheet feed cassettes 35 and 36, from which the recording paper sheet are taken out, to drive so as to carry out the taken out recording paper sheets to the transport path S1.

Then, the control unit 39a causes the transport roller 13, the registration roller 14, the transfer apparatus 11, the fixing apparatus 12, and the carry-out roller 17 to drive. Accordingly, the control unit 39a sequentially transports the recording paper sheets taken out from the sheet feed cassettes 35 and 36 along the transport path S1 to the carry-out port 37 via the transfer apparatus 11 and the fixing apparatus 12.

Then, the transfer apparatus 11 transfers the toner images formed by the toner image forming apparatus 27 on the recording paper sheets as described above. Then, the fixing apparatus 12 fixes the transferred toner images on the recording paper sheets as described above. Thus, the images are printed and recorded on the recording paper sheets. The carry-out roller 17 carries out the recording paper sheets transported to the carry-out port 37 to the relay transport apparatus 400.

Assume the case where the control unit 39a causes the document reading apparatus 100 and the image forming apparatus 200 to drive, and print and record the image on the recording paper sheet as described above. When necessity of post-processing by the post-processing apparatus 300 is selected by the input operation to the operation input unit 38, the control unit 39a transmits a signal notifying the selection result (a post-processing necessity signal) to the post-processing apparatus 300 via the communications unit 39d.

Assume the case where the control unit 39a causes the document reading apparatus 100 and the image forming apparatus 200 to drive so as to print and record the image on the recording paper sheet as described above. When the paper sheet size of the recording paper sheet used for printing and recording is selected by the input operation to the operation input unit 38 (that is, when the detecting unit 39b detects the paper sheet size), the control unit 39a transmits a signal notifying the paper sheet size (a paper sheet size signal) to the post-processing apparatus 300 via the communications unit 39d.

Assume the case where the control unit 39a causes the document reading apparatus 100 and the image forming apparatus 200 to drive so as to print and record the image on the recording paper sheet as described above. When the judging unit 39c performs the judgment (judgment on whether the length of the recording paper sheet in the transport direction is equal to or more than the predetermined reference length or not), the control unit 39a transmits a signal notifying the judgment result (a judgment result signal) to the post-processing apparatus 300 via the communications unit 39d.

Assume the case where the control unit 39a causes the document reading apparatus 100 and the image forming apparatus 200 to drive so as to print and record the image on the recording paper sheet as described above. The control unit 39a transmits a signal indicative of a start of printing and recording (a printing and recording start signal) to the post-processing apparatus 300 via the communications unit 39d.

Assume the case where the control unit 39a causes the carry-out roller 17 to drive to carry out the recording paper sheet to the relay transport apparatus 400. Then, the control unit 39a transmits a signal indicative of the carry-out speed of the carry-out roller 17 (a carry-out speed signal) to the post-processing apparatus 300 via the communications unit 39d.

When the detecting unit 40 detects that the recording paper sheet has been completely carried out from the image forming apparatus 200, the control unit 39a transmits a signal notifying the detection (a paper sheet carry-out signal) to the post-processing apparatus 300 via the communications unit 39d.

The control unit 39a transmits a detection result (a segment passing signal, that is, a signal notifying that the recording paper sheet has passed respective segments S2a and S2b in a transport path S2 of the relay transport apparatus 400) by a detecting unit 73 in the relay transport apparatus 400 to the post-processing apparatus 300 via the communications unit 39d.

The control apparatus 80 of the post-processing apparatus 300 receives these signals (the post-processing necessity signal, the paper sheet size signal, the judgment result signal, the printing and recording start signal, the carry-out speed signal, the paper sheet carry-out signal, and the segment passing signal). Accordingly, the control apparatus 80 controls the post-processing apparatus 300 and the relay transport apparatus 400 together with the operation of the image forming apparatus 200 as described later.

<Relay Transport Apparatus 400>

(Constitution of Relay Transport Apparatus 400)

Figure 3:
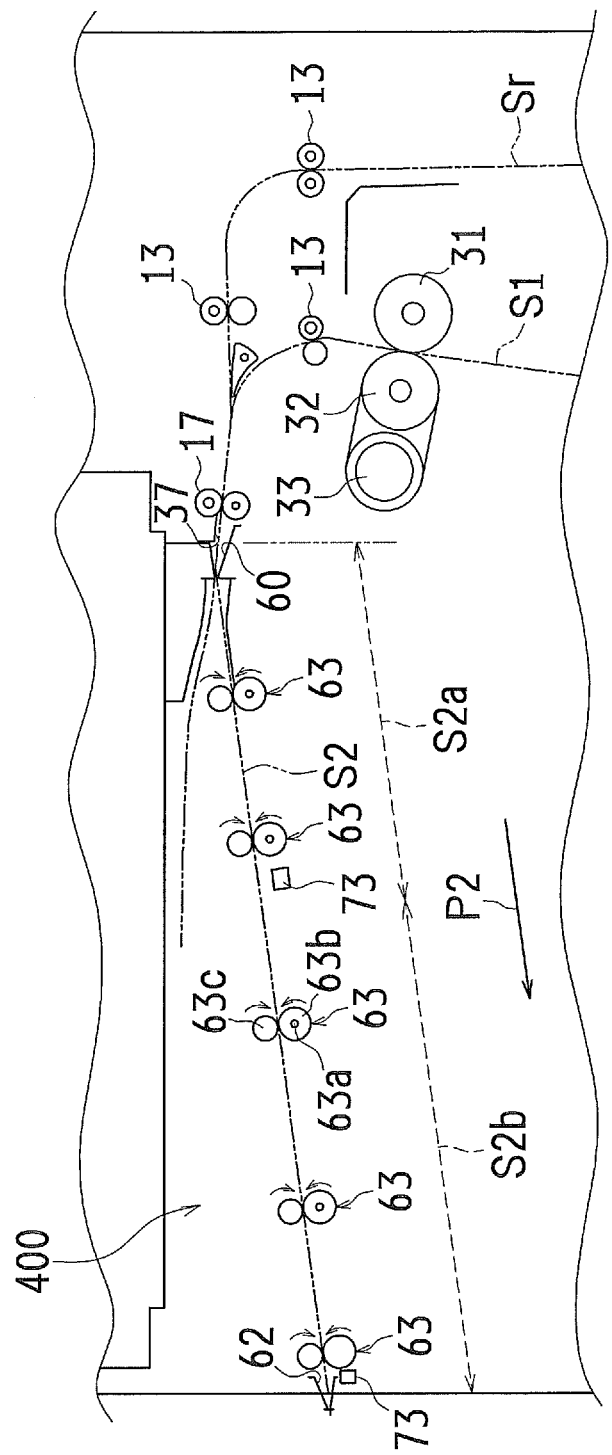
FIG. 3 is an enlarged view of a relay transport apparatus illustrated in FIG. 1.
Figure 4:
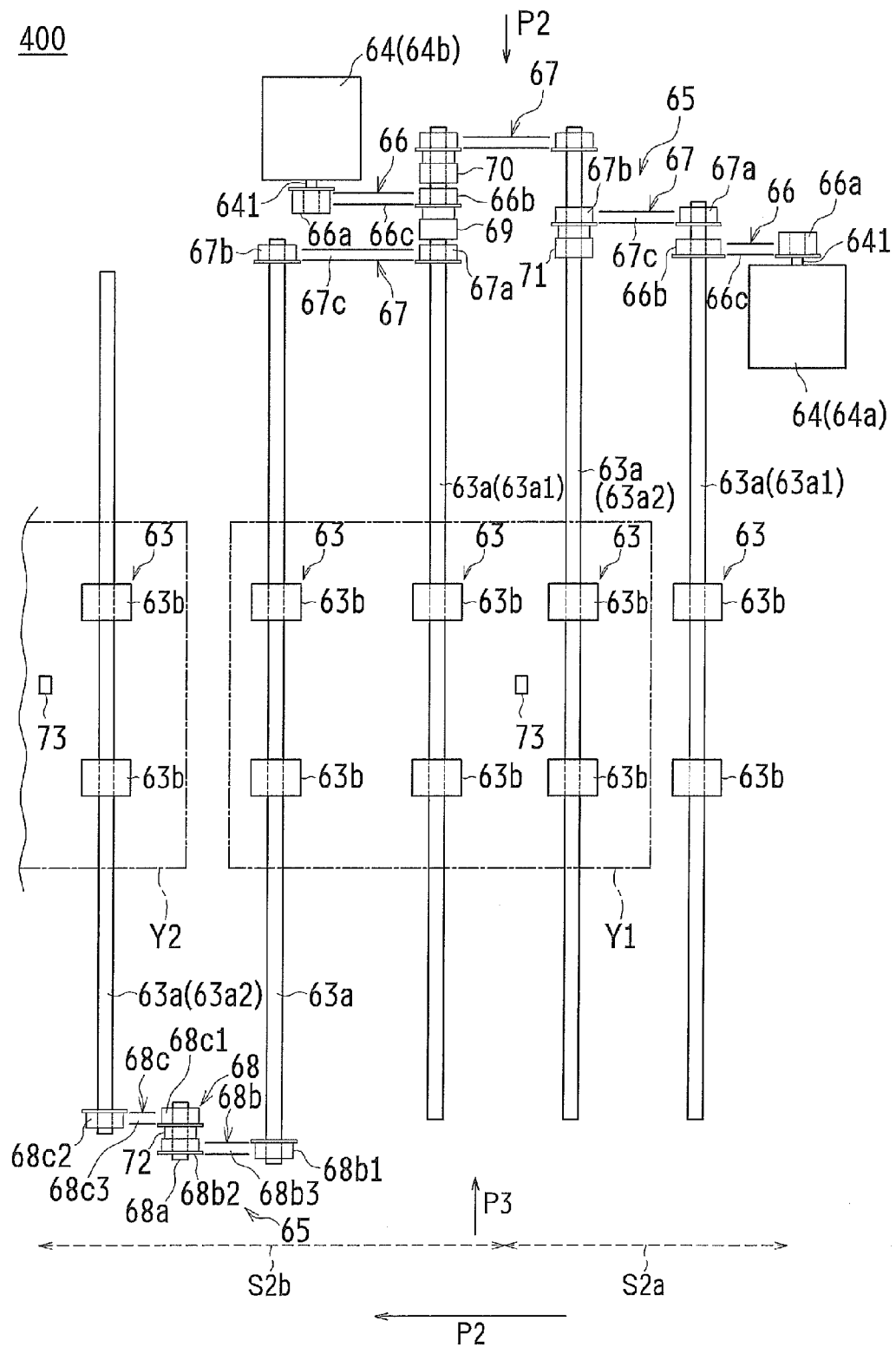
FIG. 4 is a plan view describing a constitution of the relay transport apparatus illustrated in FIG. 1.
Figure 5:
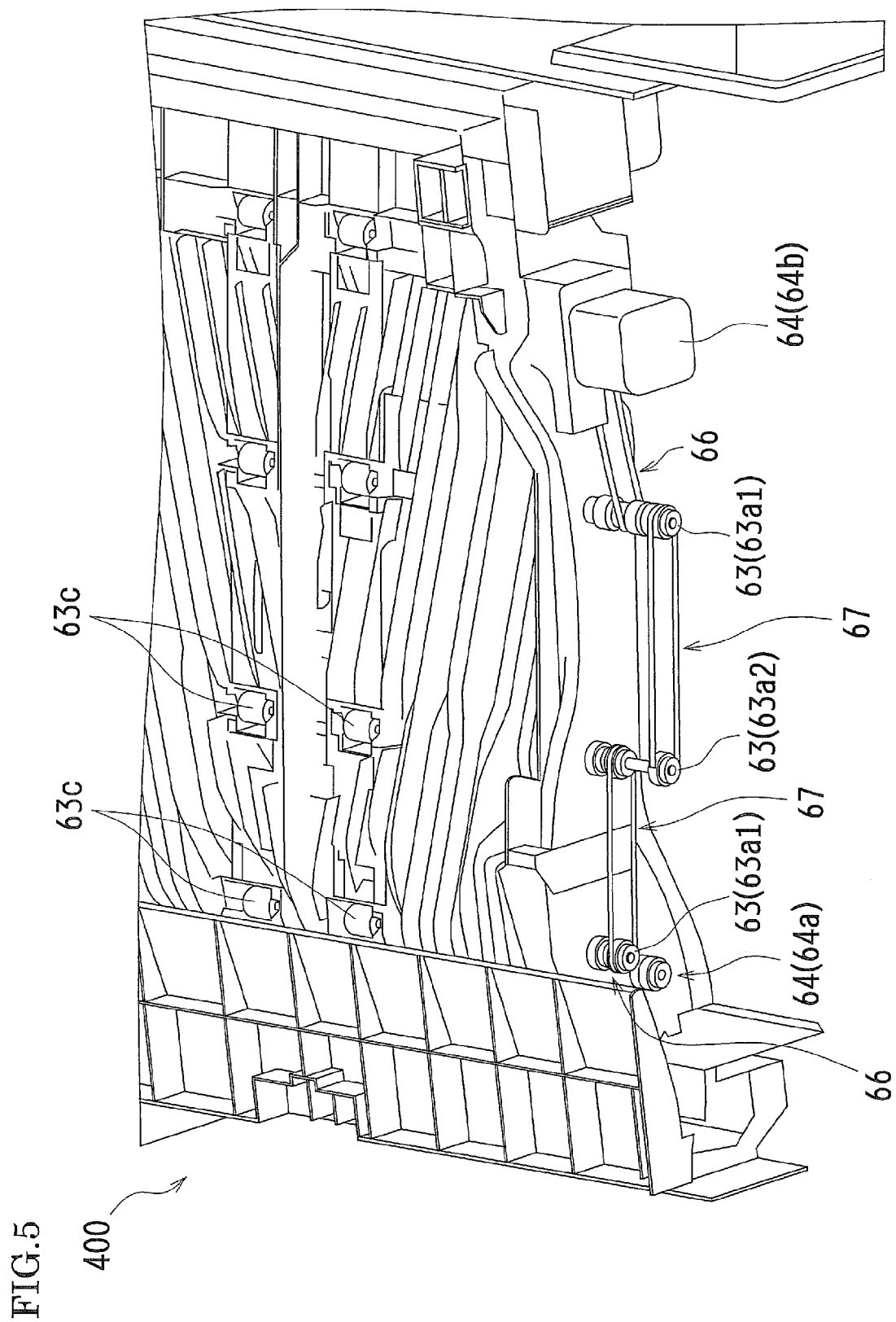
FIG. 5 is a view illustrating an exemplary perspective view viewed from an arrow direction P2 of FIG. 4.
Figure 6:
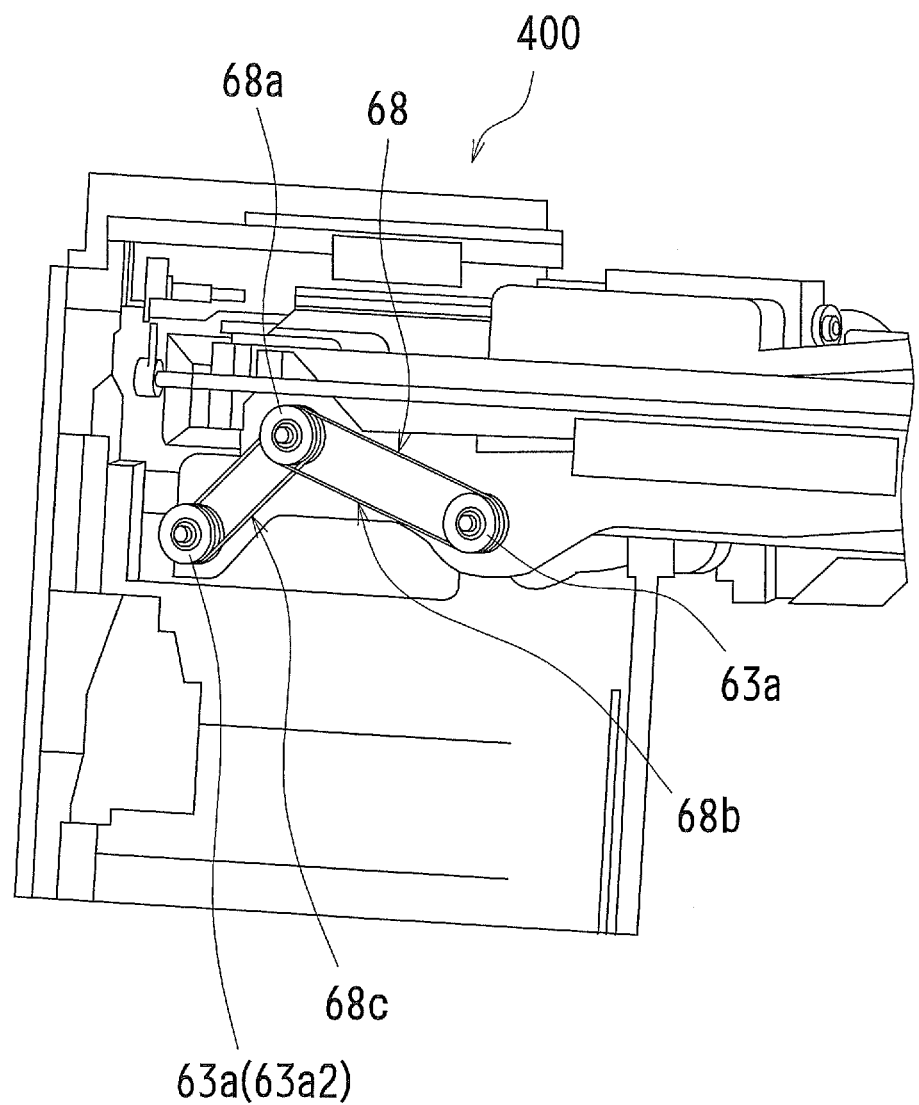
FIG. 6 is a view illustrating an exemplary perspective view viewed from an arrow direction P3 of FIG. 4.

FIG. 3 is an enlarged view of the relay transport apparatus 400 illustrated in FIG. 1. FIG. 4 is a plan view describing the constitution of the relay transport apparatus 400 illustrated in FIG. 1 (a plan view viewed from an arrow direction P1 in FIG. 1). FIG. 5 illustrates a perspective view viewed from an arrow direction P2 in FIG. 4. FIG. 6 illustrates a perspective view viewed from an arrow direction P3 in FIG. 4.

The relay transport apparatus 400 transports the recording paper sheet carried out from the image forming apparatus 200 to the post-processing apparatus 300. The relay transport apparatus 400, as illustrated in FIG. 1, FIG. 3, and FIG. 4, includes a carry-in port 60, a carry-out port 62, a transport path S2 (a first transport path), a plurality of transport units 63 (first transport units), a plurality of driving units 64, a drive transmission unit 65, and the detecting unit 73 (the first detecting unit). The transport path S2 couples the carry-in port 60 and the carry-out port 62. The transport units 63 transport the recording paper sheet along the transport path S2. The driving units 64 drive the respective transport units 63. The drive transmission unit 65 transmits outputs from the driving units 64 to the respective transport units 63. The detecting unit 73 detects whether the recording paper sheet has passed the respective segments in the transport path S2 or not. In order to simplify the drawings, FIG. 1 and FIG. 3 omit illustration of the driving unit 64 and the drive transmission unit 65.

This relay transport apparatus 400 has a drive system switchable between the one-motor drive and the multiple-motor drive. The one-motor drive drives the respective transport units 63 by only a predetermined one driving unit 64. The multiple-motor drive drives the transport units 63 by the plurality of respective driving units 64.

With this relay transport apparatus 400, when the control apparatus 80 of the post-processing apparatus 300 drives only the predetermined one driving unit 64, the drive system of the relay transport apparatus 400 automatically switches to the one-motor drive. Meanwhile, when the control apparatus 80 drives the plurality of driving units 64, the drive system of the relay transport apparatus 400 automatically switches to the multiple-motor drive. Here, the "motor" means the driving unit.

The carry-in port 60 is a portion from which the recording paper sheet carried out from the carry-out port 37 of the image forming apparatus 200 is carried in the relay transport apparatus 400. The carry-out port 62 is a portion from which the recording paper sheet transported in the relay transport apparatus 400 is carried out to the post-processing apparatus 300.

The transport path S2 is a path for transporting the recording paper sheet carried in from the carry-in port 60 to the carry-out port 62. The transport path S2 is formed so as to couple the carry-in port 60 and the carry-out port 62. This transport path S2 includes a plurality of segments (here, a segment S2a at the upstream and a segment S2b at the downstream of the transport direction P2). The following also calls the segment S2a at the upstream as the first segment S2a and the segment S2b at the downstream as the last segment S2b.

Here, the order of "first" and "last" means the order when the segments S2a and S2b are counted from the carry-in port 60 side to the carry-out port 62 side.

The respective transport units 63 transport the recording paper sheet along the transport path S2. The transport units 63 are arranged spacing from one another along the transport path S2. Here, the five transport units 63 are arranged. Among them, first two transport units 63 are arranged in the segment S2a at the upstream, the rest of the three transport units 63 are arranged in the segment S2b at the downstream.

The transport units 63 each include a rotation shaft unit 63a, a transport roller 63b, and a driven roller 63c. In order to simplify the drawing, FIG. 4 omits illustration of the driven roller 63c.

The rotation shaft unit 63a is rotatably supported around its central axis. The transport roller 63b is disposed at the rotation shaft unit 63a and rotates in association with the rotation of the rotation shaft unit 63a. The driven roller 63c is rotatably supported around its central axis. The driven roller 63c is arranged so as be in contact with the transport roller 63b and rotates in association with the rotation of the transport roller 63b. Here, the rotation shaft units 63a each include the two transport rollers 63b. The transport rollers 63b each include the one driven roller 63c.

In each transport unit 63, rotation of the rotation shaft unit 63a accordingly rotates the transport roller 63b and the driven roller 63c. In association with this rotation, the recording paper sheet is sandwiched between the transport roller 63b and the driven roller 63c and transported in the transport direction P2. Thus, the rotation of the rotation shaft unit 63a drives each transport units 63 and transports the recording paper sheet in the transport direction P2.

The detecting units 73, as illustrated in FIG. 3 and FIG. 4, are arranged at every rear portion of the respective segments S2a and S2b of the transport path S2 (for example, the end portion at the downstream in the transport direction P2). The detecting units 73 detect whether the recording paper sheet transported along the transport path S2 passed through the respective segments S2a and S2b or not (that is, whether the recording paper sheet has passed the last transport units 63 in the respective segments or not).

The respective driving units 64, for example, are motors. The driving units 64 correspond to the respective segments S2a and S2b. The driving unit 64 drives the transport units 63 in the corresponding segment S2a or S2b. Here, two driving units 64 (64a and 64b) are disposed. The one driving unit 64a corresponds to the segment S2a at the upstream and drives the transport units 63 in the segment S2a at the upstream. The other driving unit 64b corresponds to the segment S2b at the downstream and drives the transport units 63 in the segment S2b at the downstream.

When only the predetermined one driving unit among the plurality of (namely, all) driving units 64 is operated (here, a driving unit 64a corresponding to the segment S2a at the upstream, hereinafter referred to as the predetermined one driving unit 64a), the drive transmission unit 65 drives the respective transport units 63 based on an output from the predetermined one driving unit 64a. When the plurality of (namely, all) driving units 64 are operated, the drive transmission unit 65 drives the respective transport units 63 based on outputs from the driving units 64 corresponding to the respective transport units 63. The transport units 63 correspond to the respective driving units 64 corresponding to the segments S2a and S2b that includes the respective transport units 63.

The drive transmission unit 65 includes transmission units 66, 67, and 68, one-way clutches 69 and 70, and one-way clutches 71 and 72. The transmission units 66, 67, and 68 transmit drive force (an output) from the respective driving units 64 to the rotation shaft units 63*a* of the respective transport units 63. The one-way clutches 69 and 70 prevent interference of outputs from the respective driving units 64 with one another. The one-way clutches 71 and 72 prevent tension of printing paper sheets.

The transmission unit 66 (the second transmission unit) is each provided astride between an output shaft unit 641 of the driving unit 64 and the predetermined rotation shaft unit 63*a* (here, the first rotation shaft unit 63*a*1 in the corresponding segment S2*a* or S2*b*, hereinafter referred to as the predetermined rotation shaft unit 63*a*1) in the segment S2*a* or S2*b* corresponding to each driving unit 64. Thus, the output from the driving unit 64 is transmitted to the predetermined rotation shaft unit 63*a*1.

Each transmission units 66 includes a pulley 66*a*, a pulley 66*b*, and an endless belt 66*c*. The pulley 66*a* is disposed at the output shaft unit 641 of the driving unit 64 to which each transmission unit 66 is provided astride. The pulley 66*b* is disposed at the first rotation shaft unit 63*a*1 to which each transmission unit 66 is provided astride. The endless belt 66*c* is stretched between the output shaft unit 641 of the driving unit 64 and the predetermined rotation shaft unit 63*a*1 via these pulleys 66*a* and 66*b*.

In each transmission unit 66, rotation of the output shaft unit 641 of each driving unit 64 circularly moves the endless belt 66*c* stretched by the output shaft unit 641 in association with the rotation. This circular movement accordingly moves the first rotation shaft unit 63*a*1 that stretches the endless belt 66*c*. Thus, each transmission unit 66 transmits the output from the driving unit 64 to which the transmission unit 66 is disposed to the first rotation shaft unit 63*a*1 to which the transmission unit 66 is disposed.

The one-way clutch 69 (the second one-way clutch) is disposed between: the transmission unit 66, which is provided astride between the driving unit 64*b* corresponding to the segment S2*b* and the predetermined rotation shaft unit 63*a*1 in the segment S2*b*, in each segment (here, the segment S2*b*) other than the segment S2*a* corresponding to the predetermined one driving unit 64*a*; and the predetermined rotation shaft unit 63*a*1 in the segment S2*b*.

The one-way clutch 69 is a clutch mechanism that transmits rotation force only in one rotation direction. Assume the case where a rotation speed transmitted from the transmission unit 66 to which the one-way clutch 69 is disposed is equal to or more than the rotation speed of the first rotation shaft unit 63*a*1 to which it (namely, the one-way clutch 69) is disposed. Then, the one-way clutch 69 locks between the transmission unit 66 and the predetermined rotation shaft unit 63*a*1. Thus, the rotation force transmitted from the transmission unit 66 is transmitted to the predetermined rotation shaft unit 63*a*.

Meanwhile, assume the case where the rotation speed transmitted from the transmission unit 66 to which the one-way clutch 69 is disposed is less than the rotation speed of the first rotation shaft unit 63*a*1 to which it (namely, the one-way clutch 69) is disposed. Then, the one-way clutch 69 idles between the transmission unit 66 and the predetermined rotation shaft unit 63*a*1. Thus, the rotation force transmitted from the transmission unit 66 is not transmitted to the predetermined rotation shaft unit 63*a*1.

Each of the transmission units 67 and 68 (the first transmission unit) is provided astride between the respective rotation shaft units 63*a* adjacent along the transport path S2. The transmission unit 67 or 68 transmits the rotation force between the respective rotation shaft units 63*a*.

Each transmission unit 67, for example, is provided astride between the adjacent respective rotation shaft units 63*a* among the rotation shaft units 63*a* other than a last rotation shaft unit 63*a*2 in the last segment S2*b*. Each of the transmission units 67 includes pulleys 67*a* and 67*b* and an endless belt 67*c*. The pulleys 67*a* and 67*b* are disposed at the respective rotation shaft units 63*a* between which the transmission unit 67 is provided astride. The endless belt 67*c* is stretched between the respective rotation shaft units 63*a* via these pulleys 67*a* and 67*b*.

In each of the transmission units 67, when one of the rotation shaft units 63*a* between which the transmission unit 67 is provided astride rotates, in association with the rotation, the endless belt 67*c* stretched over the one rotation shaft unit 63*a* circularly moves. This circular movement accordingly rotates the other rotation shaft unit 63*a* that stretches the endless belt 67*c*. Thus, each of the transmission units 67 transmits the rotation force of the one rotation shaft unit 63*a* to the other rotation shaft unit 63*a* among the respective rotation shaft units 63*a* between which the transmission unit 67 is provided astride.

The transmission unit 68, for example, is provided astride between the last rotation shaft unit 63*a*2 in the last segment S2*b* and the rotation shaft unit 63*a* one prior to the last rotation shaft unit 63*a*2. The transmission unit 68 includes an intermediate rotation shaft unit 68*a*, a first intermediate transmission unit 68*b*, and a second intermediate transmission unit 68*c*.

The intermediate rotation shaft unit 68*a* is rotatably supported around its central axis. The intermediate rotation shaft unit 68*a* is arranged between the respective rotation shaft units 63*a* to which the transmission unit 68 is provided astride.

The first intermediate transmission unit 68*b* is provided astride between one of the respective rotation shaft units 63*a* to which the transmission unit 68 is provided astride and the intermediate rotation shaft unit 68*a*. The first intermediate transmission unit 68*b* transmits the rotation force between the one rotation shaft unit 63*a* and the intermediate rotation shaft unit 68*a*.

Here, the first intermediate transmission unit 68*b* includes pulleys 68*b*1 and 68*b*2 and an endless belt 68*b*3. The pulleys 68*b*1 and 68*b*2 are disposed at the one rotation shaft unit 63*a* and the intermediate rotation shaft unit 68*a*, respectively. The endless belt 68*b*3 is stretched between the one rotation shaft unit 63*a* and the intermediate rotation shaft unit 68*a* via these pulleys 68*b*1 and 68*b*2.

The second intermediate transmission unit 68*c* is disposed between another rotation shaft unit 63*a* with which the transmission unit 68 is provided astride and the intermediate rotation shaft unit 68*a*. The second intermediate transmission unit 68*c* transmits the rotation force between the other rotation shaft unit 63*a* and the intermediate rotation shaft unit 68*a*.

Here, the second intermediate transmission unit 68*c* includes pulleys 68*c*1 and 68*c*2 and an endless belt 68*c*3. The pulleys 68*c*1 and 68*c*2 are disposed at the other rotation shaft unit 63*a* and the intermediate rotation shaft unit 68*a*, respectively. The endless belt 68*c*3 is stretched between the other rotation shaft unit 63*a* and the intermediate rotation shaft unit 68*a* via the pulleys 68*c*1 and 68*c*2.

In this transmission unit 68, rotation of the one rotation shaft unit 63*a* accordingly circularly moves the endless belt 68*b*3 and accordingly rotates the intermediate rotation shaft unit 68*a*. In association with this rotation, the endless belt 68*c*3 circularly moves, and then the other rotation shaft unit 63*a* is rotated accordingly. Thus, the transmission unit 68 transmits the rotation force of the one rotation shaft unit 63a to the other rotation shaft unit 63a.

In this transmission unit 68, dislocating the intermediate rotation shaft unit 68a to the upward or downward of a virtual plane including the one and the other rotation shaft units 63a allows flexing the transmission path for the rotation force at the intermediate rotation shaft unit 68a. That is, a degree of freedom of provision of the transmission path for the rotation force can be improved.

The one-way clutch 70 (the first one-way clutch) is disposed between: the transmission unit 67 provided astride between the last rotation shaft unit 63a2 in each segment (here, the segment S2a) and the first rotation shaft unit 63a1 in the subsequent segment S2b; and the first rotation shaft unit 63a1 in the subsequent segment S2b.

The one-way clutch 70 is a clutch mechanism that transmits rotation force only in one rotation direction. Assume the case where the rotation speed transmitted from the transmission unit 67 to which the one-way clutch 70 is disposed is equal to or more than the rotation speed of the first rotation shaft unit 63a to which it (namely, the one-way clutch 70) is disposed. Then, the one-way clutch 70 locks between the transmission unit 67 and the first rotation shaft unit 63a. Thus, the rotation force transmitted from the transmission unit 67 is transmitted to the first rotation shaft unit 63a.

Meanwhile, assume the case where the rotation speed transmitted from the transmission unit 67 to which the one-way clutch 70 is disposed is less than the rotation speed of the first rotation shaft unit 63a to which it (namely, the one-way clutch 70) is disposed. Then, the one-way clutch 70 idles between the transmission unit 67 and the first rotation shaft unit 63a. Thus, the rotation force transmitted from the transmission unit 67 is not transmitted to the first rotation shaft unit 63a.

Which of the transmission units 67 and 68 is to be provided astride between the adjacent respective rotation shaft units 63a can be freely determined. Obviously, only the transmission unit 67 or only the transmission unit 68 can be provided astride between all the adjacent rotation shaft units 63a.

The one-way clutch 71 (the third one-way clutch), for example, is disposed between the transmission unit 67 provided astride between: the last rotation shaft unit 63a2 in the first segment S2a and the rotation shaft unit 63a one prior to the last rotation shaft unit 63a2; and the last rotation shaft unit 63a2 in the segment S2a.

The one-way clutch 71 is a clutch mechanism that transmits rotation force only in one rotation direction. Assume the case where a rotation speed transmitted from the transmission unit 67 to which the one-way clutch 71 is disposed is equal to or more than the rotation speed of the last rotation shaft unit 63a2 to which it (namely, the one-way clutch 71) is disposed. Then, the one-way clutch 71 locks between the transmission unit 67 and the last rotation shaft unit 63a2. Thus, the rotation force transmitted from the transmission unit 67 is transmitted to the last rotation shaft unit 63a2.

Meanwhile, assume the case where the rotation speed transmitted from the transmission unit 67 to which the one-way clutch 71 is disposed is less than the rotation speed of the last rotation shaft unit 63a2 to which it (namely, the one-way clutch 71) is disposed. Then, the one-way clutch 71 idles between the transmission unit 67 and the last rotation shaft unit 63a2. Thus, the rotation force transmitted from the transmission unit 67 is not transmitted to the last rotation shaft unit 63a2.

The one-way clutch 72 (the fourth one-way clutch), for example, is disposed between one of the first and the second intermediate transmission units 68b and 68c (here, 68c) and the intermediate rotation shaft unit 68a at the transmission unit 68 provided astride between the last rotation shaft unit 63a2 and the rotation shaft unit 63a one prior to the last rotation shaft unit 63a2 in the last segment S2b.

The one-way clutch 72 is a clutch mechanism that transmits rotation force only in one rotation direction. Assume the case where a rotation speed of the intermediate rotation shaft unit 68a to which the one-way clutch 72 is disposed is equal to or more than the rotation speed transmitted from the second intermediate transmission unit 68c to which it (namely, the one-way clutch 72) is disposed (in short, the rotation speed of the rotation shaft unit 63a one prior to the last rotation shaft unit 63a2 in the last segment S2b is equal to or more than the rotation speed of the last rotation shaft unit 63a2). Then, the one-way clutch 72 locks between the intermediate rotation shaft unit 68a and the second intermediate transmission unit 68c (in short, between the one-prior-to-the rotation shaft unit 63a and the last rotation shaft unit 63a2). Thus, the rotation force transmitted from the intermediate rotation shaft unit 68a is transmitted to the second intermediate transmission unit 68c (in short, the rotation force is transmitted between the intermediate rotation shaft unit 68a and the second intermediate transmission unit 68c).

Meanwhile, assume the case where the rotation speed of the intermediate rotation shaft unit 68a to which the one-way clutch 72 is disposed is less than the rotation speed transmitted from the second intermediate transmission unit 68c to which it (namely, the one-way clutch 72) is disposed (in short, the rotation speed of the rotation shaft unit 63a one prior to the last rotation shaft unit 63a2 in the last segment S2b is less than the rotation speed of the last rotation shaft unit 63a2). Then, the one-way clutch 72 idles between the intermediate rotation shaft unit 68a and the second intermediate transmission unit 68c (in short, between the one-prior-to-the rotation shaft unit 63a and the last rotation shaft unit 63a2). Thus, the rotation force transmitted from the intermediate rotation shaft unit 68a is not transmitted to the second intermediate transmission unit 68c (in short, the rotation force is not transmitted between the intermediate rotation shaft unit 68a and the second intermediate transmission unit 68c).

The above describes the case where the one-way clutch 72 is disposed between the second intermediate transmission unit 68c and the intermediate rotation shaft unit 68a; however, the one-way clutch 72 may be disposed between the first intermediate transmission unit 68b and the intermediate rotation shaft unit 68a.

(Operations by Relay Transport Apparatus 400)

The following describes an operation by the relay transport apparatus 400.

First, the following describes the operation of switching the drive system of the relay transport apparatus 400 (the one-motor drive or the multiple-motor drive).

(Switching to One-Motor Drive)

First, the following describes an operation of switching the relay transport apparatus 400 to the one-motor drive. The one-motor drive drives the predetermined one driving unit 64a alone and stops the other driving unit 64b. The respective transport units 63 are driven at the same transport speed with one another based on an output from the predetermined one driving unit 64a.

In this case, for example, the control apparatus of the post-processing apparatus 300 drives only the predetermined one driving unit 64a (that is, only the predetermined one driving unit 64a operates). Thus, when only the predetermined one driving unit 64a is driven, the drive force is transmitted to the first rotation shaft unit 63a1 via the transmission unit 66 provided astride between the output shaft unit 641 of the predetermined one driving unit 64*a* and the first rotation shaft unit 63*a*1. The drive force is transmitted from the first rotation shaft unit 63*a*1 to other rotation shaft units 63*a* via the transmission units 67 and 68.

Then, the one-way clutch 70 locks. As described above, the drive force (the rotation force) transmitted from the transmission unit 67 to which the one-way clutch 70 is disposed is transmitted to the first rotation shaft unit 63*a*1 to which the one-way clutch 70 is disposed.

More specifically, as described above, the transmission unit 67 to which the one-way clutch 70 is disposed transmits the drive force to the one-way clutch 70 (that is, the rotation speed is transmitted). However, the driving unit (here, 64*b*) other than the predetermined one driving unit 64*a* is not driven. The drive force of the driving unit 64*b* becomes a zero; therefore, the drive force is not transmitted to the first rotation shaft unit 63*a*1 to which the one-way clutch 70 is disposed (that is, the rotation speed is not transmitted).

Accordingly, the rotation speed transmitted from the transmission unit 67 to the one-way clutch 70 becomes equal to or more than the rotation speed of the first rotation shaft unit 63*a*1. Accordingly, the one-way clutch 70 locks. The one-way clutch 70 transmits the drive force (the rotation force) transmitted from the transmission unit 67 to the first rotation shaft unit 63*a*1.

Further, in this state, the rotation speed transmitted from the stopped driving unit 64*b* to the one-way clutch 69 via the transmission unit 66 becomes a zero; therefore, the rotation speed is less than the rotation speed of the first rotation shaft unit 63*a*1 to which the one-way clutch 69 is disposed.

In view of this, the one-way clutch 69 idles. The one-way clutch 69 does not transmit the rotation force transmitted from the stopped driving unit 64*b* (in this case, since the rotation speed becomes a zero, the rotation force becomes braking force against the rotation of the first rotation shaft unit 63*a*1) to the first rotation shaft unit 63*a*1 to which the one-way clutch 69 is disposed via the transmission unit 66.

Thus, the first rotation shaft unit 63*a*1 rotates by the drive force from the predetermined one driving unit 64*a* without the braking force applied from the stopped driving unit 64*b*.

Thus, the drive force from the predetermined one driving unit 64*a* is transmitted to the respective rotation shaft units 63*a*. This causes the respective transport units 63 to drive at the same transport speed with one another based on the output from the predetermined one driving unit 64*a*. A method for controlling the transport speeds of the respective transport units 63 in this case will be described in detail in (Exemplary One-Motor Control 1) and (Exemplary One-Motor Control 2), which will be described below.

(Switching to Multiple-Motor Drive)

The following describes an operation of switching the relay transport apparatus 400 to the multiple-motor drive. The multiple-motor drive drives all the driving units 64. The transport units 63 are driven based on outputs from the corresponding respective driving units 64.

In this case, for example, to prevent deflection of the recording paper sheet, the rotation speeds of the rotation shaft units 63*a* inside of the segments (here, segment S2*b*) is actually controlled so as to be equal to or more than the rotation speed of the respective rotation shaft units 63*a* in the segment one prior to the segment (here, the segment S2*a*). The following describes considering this control.

In this case, the control apparatus of the post-processing apparatus 300 drives the plurality of (namely, all) driving units 64 (that is, the plurality of driving units 64 operate). Thus, when the plurality of driving units 64 are driven, the drive forces from the respective driving units 64 are transmitted to the first rotation shaft unit 63*a*1 via the transmission unit 66, which is provided astride between the output shaft unit 641 of the respective driving units 64 and the first rotation shaft unit 63*a*1 in the segments S2*a* and S2*b* corresponding to the respective driving units 64. Then, the drive forces are transmitted from the first rotation shaft unit 63*a*1 to the other rotation shaft units 63*a* in the same segment via the respective transmission units 67 and 68.

Then, considering the above-described control, the rotation speed transmitted from the driving unit 64*b* corresponding to the segment S2*b* other than the first segment S2*a* to the one-way clutch 69 via the transmission unit 66 is equal to or more than the rotation speed of the first rotation shaft unit 63*a*1 to which the one-way clutch 69 is disposed. Then, the one-way clutch 69 locks. The drive force (the rotation force) transmitted from the driving unit 64*b* via the transmission unit 66 is transmitted to the first rotation shaft unit 63*a*1 to which the one-way clutch 69 is disposed.

Considering the above-described control, the rotation speed transmitted from the transmission unit 67 provided astride between the last rotation shaft unit 63*a*2 in each segment (here, the segment S2*a*) and the first rotation shaft unit 63*a*1 in the subsequent segment (here, the segment S2*b*) to the one-way clutch 70 disposed at the first rotation shaft unit 63*a*1 (that is, the rotation speed transmitted from the driving unit 64*a*) is less than the rotation speed of the first rotation shaft unit 63*a*1. In view of this, the one-way clutch 70 idles. The one-way clutch 70 does not transmit the drive force transmitted from the transmission unit 67 to the first rotation shaft unit 63*a*1. That is, the one-way clutch 70 does not transmit the rotation forces transmitted in each segment S2*a* or S2*b* to the segment S2*b* or S2*a*, which is a segment adjacent to each segment S2*a* or S2*b*.

Thus, the drive forces from the driving units 64 are transmitted to the respective rotation shaft units 63*a* in the segments S2*a* and S2*b* corresponding to the respective driving units 64. This, the transport units 63 are driven based on the outputs from the respective corresponding driving units 64. A method for controlling the transport speeds of the respective transport units 63 in this case will be described in detail in (Exemplary Multiple-Motor Control), which will be described below.

As described above, driving the transport units 63 transports the recording paper sheet carried in from the carry-in port 60 by the respective transport units 63 to the carry-out port 62 along the transport path S2.

(Operations by One-Way Clutch 71 for Preventing Stretch)

The following describes operations by the one-way clutch 71 for preventing tension based on FIG. 3 and FIG. 4.

In the case where a transport speed Vb in the segment S2*b* is faster than a transport speed Va in the previous segment S2*a*, the following considers the case where a recording paper sheet Y1 during transport (see FIG. 4) goes across the respective segments S2*a* and S2*b* (for example, the front half portion of a recording paper sheet Y1, (namely, the half portion at the downstream in a transport direction P2) is transported by the respective transport units 63 in the segment S2*b* at the transport speed Vb, and the rear end portion of the recording paper sheet (namely, the end portion at the upstream in the transport direction P2) is transported by the last transport unit 63 in the segment S2*a* at the transport speed Va).

In this case, the one-way clutch 71, which is disposed at the last rotation shaft unit 63*a*2 in the segment S2*a*, idles. That is, in this case, to the one-way clutch 71, the transmission unit 67 provided astride between the last rotation shaft unit 63*a*2 to which the one-way clutch 71 is disposed and the rotation shaft unit 63a one prior to the last rotation shaft unit 63a2 transmits a rotation speed ωa corresponding to the transport speed Va.

Meanwhile, to the last rotation shaft unit 63a2 to which the one-way clutch 71 is disposed, a rotation speed ωb corresponding to the transport speed Vb in the segment S2b is transmitted via the transport units 63 in the segment S2b, the recording paper sheet Y1 during transport, and the transport roller 63b disposed at the last rotation shaft unit 63a2 in the segment S2a. In this case, the rotation speed ωb is greater than the rotation speed ωa; therefore, the one-way clutch 71 idles.

By this idling state, the one-way clutch 71 does not transmit the rotation force transmitted from the transmission unit 67 to the last rotation shaft unit 63a2. Thus, the transport roller 63b disposed at the last rotation shaft unit 63a2 in the segment S2a is not rotatably driven at the rotation speed ωa corresponding to the transport speed Va in the segment S2a. The transport roller 63b is rotated at the rotation speed ωb (>ωa) corresponding to the transport speed Vb in association with the transport of the recording paper sheet Y1 transported by the respective transport units 63 in the segment S2b at the transport speed Vb.

Accordingly, without stretching the recording paper sheet Y1 going across the respective segments S2a and S2b due to a difference between the transport speeds Va and Vb in the respective segments S2a and S2b by the last transport unit 63 in the segment S2a, the transport units 63 in the segment S2b transport the recording paper sheet Y1 at the transport speed Vb.

(Operations by One-Way Clutch 72 for Preventing Stretch)

The following describes operations of the one-way clutch 72 for preventing tension based on FIG. 1 and FIG. 4.

In the case where a transport speed Vc in the post-processing apparatus 300 is faster than the transport speed Vb in the last segment S2b, the following considers the case where a recording paper sheet Y2 during transport (see FIG. 4) goes across the segment S2b and the post-processing apparatus 300 (for example, the front half portion of the recording paper sheet Y2, (namely, the half portion at the downstream in the transport direction P2) is transported by respective transport units 75 in the post-processing apparatus 300 at the transport speed Vc, and the rear end portion of the recording paper sheet Y2 (namely, the end portion at the upstream in the transport direction P2) is transported by the last transport unit 63 in the segment S2b at the transport speed Vb).

In this case, the one-way clutch 72, which is disposed at the intermediate rotation shaft unit 68a, idles. The intermediate rotation shaft unit 68a is disposed between the last rotation shaft unit 63a2 in the segment S2b and the rotation shaft unit 63a one prior to the last rotation shaft unit 63a2.

That is, in this case, to the intermediate rotation shaft unit 68a to which the one-way clutch 72 is disposed, the one-prior-to rotation shaft unit 63a transmits the rotation speed ωa corresponding to the transport speed Va via the transmission unit 68b provided astride between it (namely, the one-prior-to rotation shaft unit 63a) and the intermediate rotation shaft unit 68a. Meanwhile, to the one-way clutch 72, a rotation speed ωc corresponding to the transport speed Vc of the transport units 75 in the post-processing apparatus 300 is transmitted via the transport units 75 in the post-processing apparatus 300, the recording paper sheet Y2 during transport, the transport roller 63b disposed at the last rotation shaft unit 63a2 in the segment S2b, and the second intermediate transmission unit 68c disposed between the last rotation shaft unit 63a2 and the one-way clutch 72. In this case, the rotation speed ωc is greater than the rotation speed ωb; therefore, the one-way clutch 72 idles.

By this idling state, the one-way clutch 72 does not transmit the rotation force from the first intermediate rotation shaft unit 68a to the second intermediate transmission unit 68c. Thus, the last rotation shaft unit 63a2 to which the second intermediate transmission unit 68c is disposed (accordingly, the transport roller 63b disposed to the last rotation shaft unit 63a2) is not rotatably driven at the rotation speed ωb corresponding to the transport speed Vb in the segment S2b. The last rotation shaft unit 63a2 is rotated at the rotation speed ωc (>ωb) corresponding to the transport speed Vc in association with the transport of the recording paper sheet Y2 transported by the respective transport units 75 in the post-processing apparatus 300 at the transport speed Vc.

Accordingly, the last transport unit 63 in the segment S2b does not stretch the recording paper sheet Y2 going across the segment S2b and the post-processing apparatus 300 due to the difference between the transport speed Vc of the post-processing apparatus 300 and the transport speed Vb in the segment S2b. Thus, the transport units 75 in the post-processing apparatus 300 transport the recording paper sheet Y2 at the transport speed Vc.

<Post-Processing Apparatus 300>

(Constitution of Post-Processing Apparatus 300)

The post-processing apparatus 300 performs predetermined post-processing on the recording paper sheet transported from the relay transport apparatus 400. The post-processing apparatus 300, as illustrated in FIG. 1 and FIG. 2, includes a carry-in port 81, a post-processing unit 82, discharge trays 83 and 84, transport paths S3a and S3b, a transport roller 85, discharge rollers 86 and 87, a driving unit 88 (see FIG. 2), a switching unit 89, and the control apparatus 80 (see FIG. 2).

In this embodiment, the control apparatus 80 controls the post-processing apparatus 300 and also controls the relay transport apparatus 400.

To the carry-in port 81, the recording paper sheet carried out from the relay transport apparatus 400 is carried in.

The post-processing unit 82 performs predetermined post-processing (for example, a process that binds the desired number of recording paper sheets by, for example, embossing or stapling) on the recording paper sheet carried in from the carry-in port 81.

The discharge tray 83 is a tray from which the recording paper sheet post-processed by the post-processing unit 82 is discharged. The discharge tray 84 is a tray from which the recording paper sheet not post-processed by the post-processing unit 82 is discharged.

The transport path S3a is a path that transports the recording paper sheet carried in from the carry-in port 81 to the discharge tray 83 via the post-processing unit 82. The transport path S3a is formed so as to couple the carry-in port 81 and the discharge tray 83. The transport path S3b is a path that transports the recording paper sheet carried in from the carry-in port 81 to the discharge tray 84 via the post-processing unit 82. The transport path S3b is formed so as to couple the carry-in port 81 and the discharge tray 84.

The transport roller 85 transports the recording paper sheet carried in from the carry-in port 81 to the discharge tray 83 along the transport path S3a. The plurality of transport rollers 85 are arranged along the transport path S3a. The discharge roller 86 discharges the recording paper sheet transported along the transport path S3a to the discharge tray 83. The discharge roller 86 is arranged near a terminating end of the transport path S3a. The discharge roller 87 discharges the recording paper sheet post-processed by the post-processing unit 82 to the discharge tray 84. The discharge roller 87 is arranged near the terminating end of the transport path S3b.

The driving unit 88, for example, is a motor. The driving unit 88 drives the transport rollers 85 and discharge rollers 86 and 87.

The switching unit 89 switches the transport direction of the recording paper sheet carried in from the carry-in port 81 to the transport path S3*a* side or the transport path S3*b* side and is arranged near the carry-in port 81.

The control apparatus 80 includes communications unit 80*a*, a switching unit 80*b* (a switching unit), a determining unit 80*d* (a determining unit), and a control unit 80*c* (a first control unit). The communications unit 80*a* communicates with the communications unit 39*d* of the image forming apparatus 200. The switching unit 80*b* switches the control system of the relay transport apparatus 400 (the multiple-motor control or the one-motor control) based on a reception result of the communications unit 80*a*. The determining unit 80*d* determines whether to perform post-processing or not based on the reception result of the communications unit 80*a*. The control unit 80*c* controls the post-processing apparatus 300 based on a determination result of the determining unit 80*d* and also controls the relay transport apparatus 400 based on the reception result of the communications unit 80*a* and a switching result of the switching unit 80*b*.

The multiple-motor control is a control method for driving all the driving units 64 of the relay transport apparatus 400. The one-motor control is a control method for driving only the predetermined one driving unit (for example, 64*a*) among the respective driving units 64 of the relay transport apparatus 400 but does not drive another driving unit (for example, 64*b*).

The communications unit 80*a* receives the printing and recording start signal, the carry-out speed signal, the post-processing necessity signal, the paper sheet size signal, the judgment result signal, the paper sheet carry-out signal, and the segment passing signal from the communications unit 39*d* of the image forming apparatus 200.

The switching unit 80*b* switches the control system of the relay transport apparatus 400 to the multiple-motor control or the one-motor control based on the post-processing necessity signal and the judgment result signal received by the communications unit 80*a*.

More specifically, for example, when the post-processing necessity signal has contents requiring post-processing and the judgment result signal has contents indicating that the length of the recording paper sheet in the transport direction is equal to or more than the predetermined reference length, the switching unit 80*b* switches the relay transport apparatus 400 to the multiple-motor control.

When the post-processing necessity signal has contents requiring the post-processing and the judgment result signal has contents indicating that the length of the recording paper sheet in the transport direction is less than the predetermined reference length, the switching unit 80*b* switches the relay transport apparatus 400 to the one-motor control.

If the post-processing necessity signal has contents not requiring the post-processing, the switching unit 80*b* switches the relay transport apparatus 400 to the one-motor control.

When the post-processing necessity signal received by the communications unit 80*a* has contents requiring the post-processing, the determining unit 80*d* determines execution of the post-processing on the recording paper sheet carried in to the post-processing apparatus 300. When the post-processing necessity signal received by the communications unit 80*a* has contents not requiring the post-processing, the determining unit 80*d* determines not to perform the post-processing on the recording paper sheet carried in to the post-processing apparatus 300.

When the switching unit 80*b* switches the control system of the relay transport apparatus 400 to the multiple-motor control, the control unit 80*c* performs the multiple-motor control on the relay transport apparatus 400 based on the carry-out speed signal, the paper sheet carry-out signal, and the segment passing signal received by the communications unit 80*a*, like (Exemplary Multiple-Motor Control), which will be described later.

In the case where the switching unit 80*b* switches the control system of the relay transport apparatus 400 to the one-motor control, when the judgment result signal received by the communications unit 80*a* has the contents indicating that the recording paper sheet has equal to or more than the predetermined reference length, the control unit 80*c* performs the one-motor control on the relay transport apparatus 400 based on the carry-out speed signal received by the communications unit 80*a*, like (Exemplary One-Motor Control 1), which will be described later.

Meanwhile, in the case where the switching unit 80*b* switches the control system of the relay transport apparatus 400 to the one-motor control, when the judgment result signal received by the communications unit 80*a* has the contents that the recording paper sheet has less than the predetermined reference length, the control unit 80*c* performs the one-motor control on the relay transport apparatus 400 based on the carry-out speed signal received by the communications unit 80*a*, like (Exemplary One-Motor Control 2), which will be described later.

When the determining unit 80*d* determines execution of the post-processing on the recording paper sheet, the control unit 80*c* controls the post-processing apparatus 300 so as to post-process the recording paper sheet based on the paper sheet size signal received by the communications unit 80*a*, like (Exemplary Control of Post-Processing Apparatus 1), which will be described later.

When the determining unit 80*d* determines not to perform the post-processing on the recording paper sheet, the control unit 80*c* controls the post-processing apparatus 30 so as not to post-process the recording paper sheet, like (Exemplary Control of Post-Processing Apparatus 2), which will be described later.

(Exemplary Control of Post-Processing Apparatus 1)

When the determining unit 80*d* determines execution of the post-processing on the recording paper sheet, the control unit 80*c* controls the switching unit 89 so that the transport direction of the recording paper sheet carried in to the post-processing apparatus 300 becomes the transport path S3*b* side. Further, the control unit 80*c* identifies the paper sheet size of the recording paper sheet to be carried in to the post-processing unit 82 based on the paper sheet size signal. Further, the control unit 80*c* controls the post-processing unit 82 so that the post-processing unit 82 performs the predetermined post-processing on the recording paper sheet to be carried in the post-processing unit 82 based on the identified paper sheet size. Further, the control unit 80*c* drives the discharge roller 87 so that the recording paper sheet post-processed by the post-processing unit 82 is discharged to the discharge tray 84.

(Exemplary Control of Post-Processing Apparatus 2)

When the determining unit 80*d* determines not to perform the post-processing on the recording paper sheet, the control unit 80*c* controls the switching unit 89 so that the transport direction of the recording paper sheet carried in to the post-processing apparatus 300 becomes the transport path S3*a* side. Further, the control unit 80*c* drives the transport roller 85 and the discharge roller 86 so that the recording paper sheet carried in to the post-processing apparatus 300 is transported along the transport path S3a and is discharged to the discharge tray 83.

(Exemplary Multiple-Motor Control)

Figure 7:
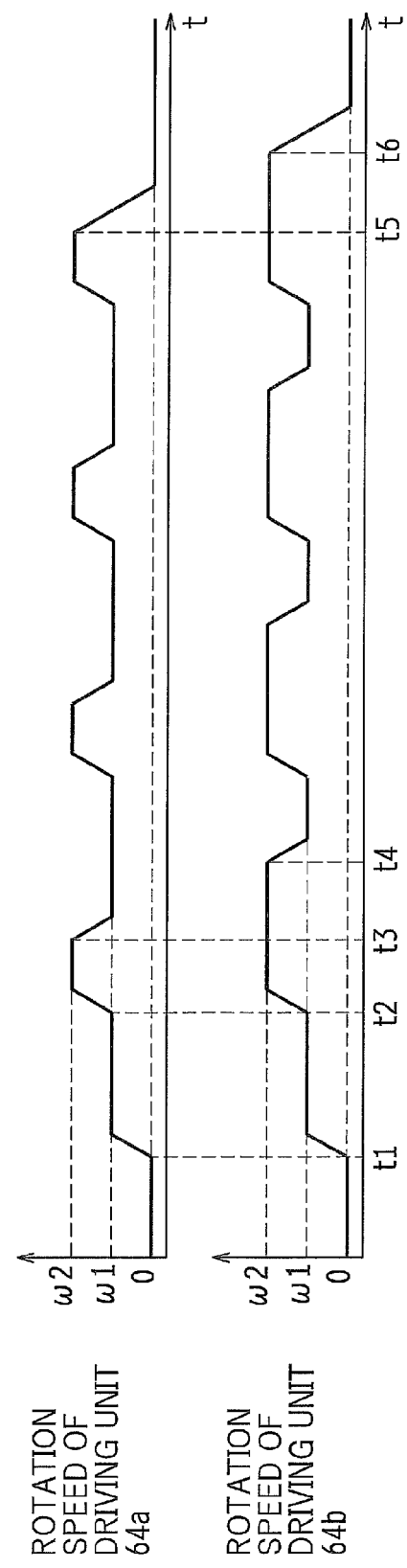
FIG. 7 is a view describing an exemplary multiple-motor control.

The following describes an exemplary multiple-motor control based on FIG. 7. FIG. 7 illustrates temporal change of the rotation speeds of the respective driving units 64a and 64b when, for example, the four recording paper sheets are carried out from the image forming apparatus 200 one by one and are transported by the relay transport apparatus 400. The vertical axes of FIG. 7 indicate the rotation speeds of the respective driving units 64a and 64b, and the horizontal axes of FIG. 7 indicate time.

The multiple-motor control is a motor control suitable to transport the recording paper sheet at a fast transport speed and a short paper interval in the case where the recording paper sheet has a length equal to or more than the predetermined reference length in the transport direction.

The control unit 80c starts driving and rotating the respective driving units 64a and 64b of the relay transport apparatus 400 at the rotation speed oil so that the transport speeds of the respective transport units 63 of the relay transport apparatus 400 become the same speed as a carry-out speed V1 of the carry-out roller 17 operated together with, for example, a start of rotation of the carry-out roller 17 of the image forming apparatus 200 (for example, time t1), based on the carry-out speed signal.

Then, when the control unit 80c detects that the recording paper sheet has been completely carried out from the image forming apparatus 200 to the relay transport apparatus 400 based on the paper sheet carry-out signal (time t2), the control unit 80c accelerates the respective driving units 64a and 64b of the relay transport apparatus 400 and rotates the respective driving units 64a and 64b at the rotation speed $\omega 2$ ($>\omega 1$) so that the transport speeds of the respective transport units 63 of the relay transport apparatus 400 accelerate to the speed V2 (>V1).

Then, when the control unit 80c detects that the recording paper sheet carried out to the relay transport apparatus 400 has passed the segment S2a based on the segment passing signal (time t3), the control unit 80c decelerates the driving unit 64a corresponding to the segment S2a and rotates the driving unit 64a at the rotation speed $\omega 1$ so that the transport speeds of the respective transport units 63 in the segment S2a decelerate to the speed V1 (namely, the carry-out speed of the carry-out roller 17). Then, the image forming apparatus 200 carries out the next recording paper sheet from the image forming apparatus 200 to the relay transport apparatus 400 at the speed V1.

Then, when the control unit 80c detects that the recording paper sheet to be carried out in the relay transport apparatus 400 has passed the segment S2b based on the segment passing signal (time t4), the control unit 80c decelerates the driving unit 64b corresponding to the segment S2b and rotates the driving unit 64b at the rotation speed $\omega 1$ so that the transport speeds of the respective transport units 63 in the segment S2b decelerate to the speed V1.

The above-described operations are repeated whenever the recording paper sheet is carried out from the image forming apparatus 200 to the relay transport apparatus 400. After the last (fourth) recording paper sheet has passed the respective segments S2a and S2b (time t5 and t6), the driving units 64a and 64b corresponding to the segments S2a and S2b, respectively, are sequentially decelerated and then stopped.

This multiple-motor control carries out the recording paper sheet from the image forming apparatus 200 to the relay transport apparatus 400 at the speed V1, and then accelerates the transport speeds of the respective transport units 63 of the relay transport apparatus 400 from the speed V1 to the speed V2. This allows transporting the recording paper sheet at the speed V2, which is faster than the speed V1, during the carry-out.

When the recording paper sheet has passed the respective segments S2a and S2b in the transport path S2, the transport speeds of the transport units 63 in the passed segments S2a and S2b are sequentially decelerated to the speed V1 (namely, the carry-out speed of the carry-out roller 17). In view of this, before the recording paper sheet has completely passed the transport path S2, the next recording paper sheet can be carried out from the image forming apparatus 200 to the relay transport apparatus 400. That is, the recording paper sheet can be transported at a shorter paper interval than the length of the transport path S2.

(Exemplary One-Motor Control 1)

Figure 8:
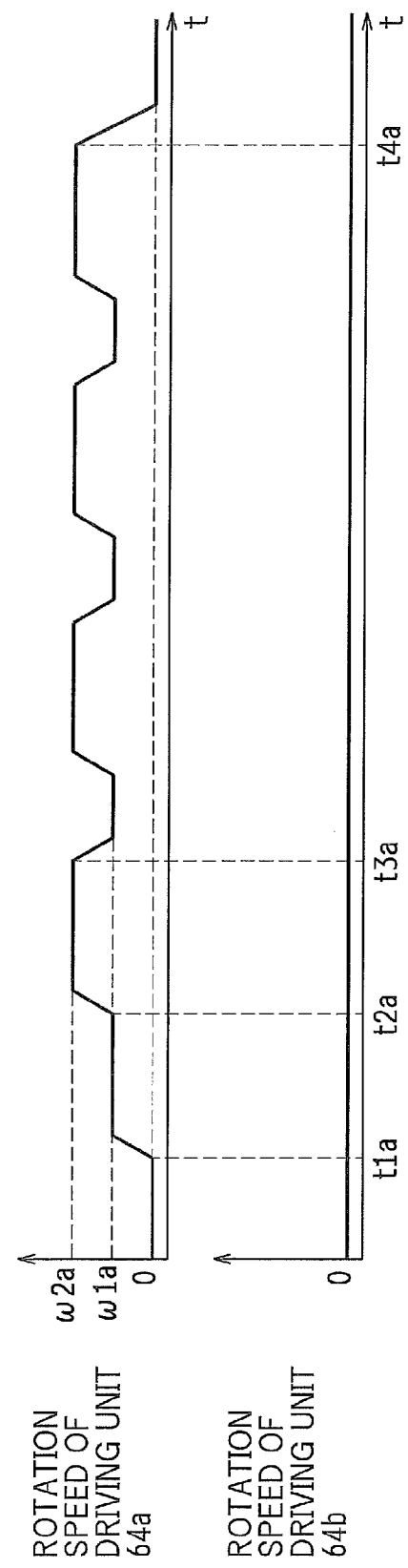
FIG. 8 is a view describing an exemplary one-motor control.

The following describes an exemplary one-motor control 1 based on FIG. 8. FIG. 8 illustrates temporal change of the rotation speeds of the respective driving units 64a and 64b when, for example, the four recording paper sheets are carried out from the image forming apparatus 200 one by one and are transported by the relay transport apparatus 400. The vertical axes of FIG. 8 indicate the rotation speeds of the respective driving units 64a and 64b, and the horizontal axes of FIG. 8 indicate time.

The exemplary one-motor control 1 is one-motor control suitable to the case where transporting the recording paper sheet at a fast transport speed and a short paper interval is not required in the case where the recording paper sheet has a length equal to or more than the predetermined reference length in the transport direction.

When the recording paper sheet has a length equal to or more than the predetermined reference length in the transport direction and the front end of the recording paper sheet arrives the first transport unit 63 among the respective transport units 63 of the relay transport apparatus 400, the rear end of the recording paper sheet still remains at the fixing roller 32. Accordingly, the control unit 39a of the image forming apparatus 200 controls the carry-out roller 17 at the same speed as a rotation speed $\omega 1a$ of the fixing roller 32.

Consequently, the recording paper sheet is carried out from the image forming apparatus 200 to the relay transport apparatus 400 at a carry-out speed V1a corresponding to the rotation speed cola. Based on this, the following describes the exemplary one-motor control 1 in detail.

When the judgment result signal has contents indicating that the length of the recording paper sheet in the transport direction is equal to or more than the predetermined reference length, the control unit 80c performs the one-motor control on the relay transport apparatus 400 as follows.

That is, the control unit 80c starts driving and rotating the predetermined one driving unit (for example, 64a) only at the rotation speed cola so that the transport speeds of the respective transport units 63 of the relay transport apparatus 400 become the same speed as the carry-out speed V1a of the carry-out roller 17 operated together with, for example, a start of rotation of the carry-out roller 17 of the image forming apparatus 200 (time t1 a), based on the carry-out speed signal. Then, the control unit 80c causes another driving unit (for example, 64b) not to drive.

Then, when the control unit 80c detects that the recording paper sheet has been completely carried out from the image forming apparatus 200 to the relay transport apparatus 400 based on the paper sheet carry-out signal (time t2a), the control unit 80c accelerates the predetermined one driving unit 64a of the relay transport apparatus 400 and rotates the predetermined one driving unit 64a at a rotation speed ω2a (>ω1a) so that the transport speeds of the respective transport units 63 of the relay transport apparatus 400 accelerate to a speed V2a (>V1a).

Then, when the control unit 80c detects that the recording paper sheet has passed the segment S2b (namely, the transport path S2) based on the segment passing signal (time t3a), the control unit 80c decelerates the predetermined one driving unit 64a and rotates the predetermined one driving unit 64a at the rotation speed ω1a so that the transport speeds of the respective transport units 63 in the relay transport apparatus 400 decelerate to the speed V1a. Then, the image forming apparatus 200 carries out the next recording paper sheet to the relay transport apparatus 400 at the speed V1a.

The recording paper sheet that has passed the transport path S2 is carried out to the post-processing apparatus 300. In the post-processing apparatus 300, the recording paper sheet is transported at the same speed as the transport speed V2 of when the recording paper sheet is carried out from the relay transport apparatus 400 to the post-processing apparatus 300.

The above-described operations are repeated whenever the recording paper sheet is carried out from the image forming apparatus 200 to the relay transport apparatus 400. After the last (fourth) recording paper sheet has passed the transport path S2 (time t4), the predetermined one driving unit 64a is decelerated and then stopped.

This one-motor control drives only the predetermined one driving unit 64a, allowing reduction in power consumption.

This one-motor control carries out the recording paper sheet from the image forming apparatus 200 to the relay transport apparatus 400 at the speed V1, and then accelerates the transport speeds of the respective transport units 63 of the relay transport apparatus 400 from the speed V1 to the speed V2. This allows transporting the recording paper sheet at the speed V2, which is faster than the speed V1 during the carry-out.

(Exemplary One-Motor Control 2)

Figure 9:
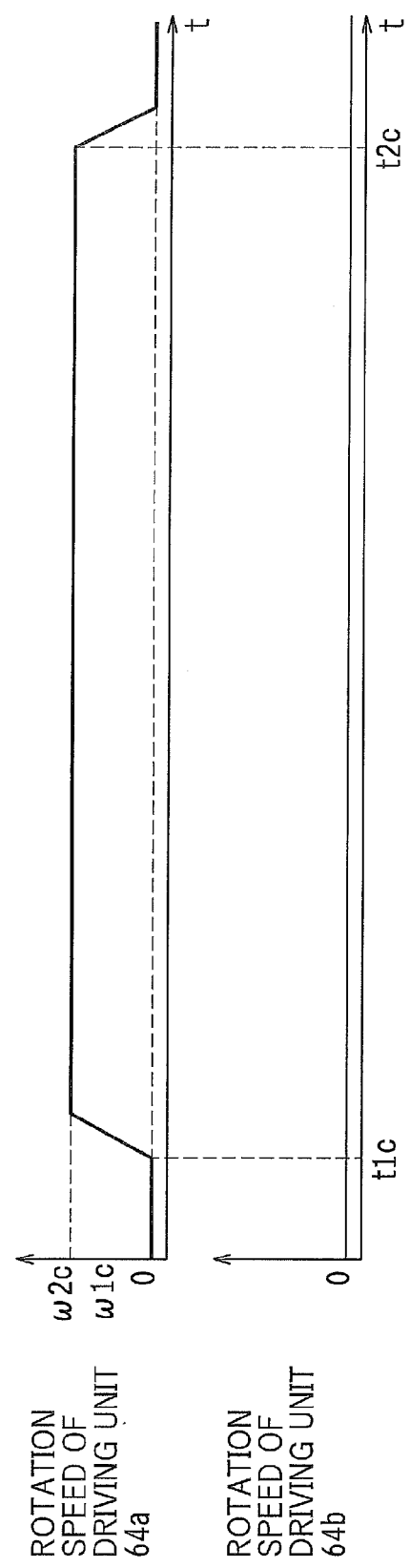
FIG. 9 is a view describing another exemplary one-motor control.

The following describes an exemplary one-motor control 2 based on FIG. 9. FIG. 9 illustrates temporal change of the rotation speeds of the respective driving units 64a and 64b when, for example, the four recording paper sheets are carried out from the image forming apparatus 200 one by one and are transported by the relay transport apparatus 400. The vertical axes of FIG. 9 indicate the rotation speeds of the respective driving units 64a and 64b, and the horizontal axes of FIG. 9 indicate time.

The exemplary one-motor control 2 is one-motor control suitable to transport the recording paper sheet at a fast transport speed and a short paper interval in the case where the recording paper sheet has a length less than the predetermined reference length in the transport direction.

When the recording paper sheet has a length less than the predetermined reference length in the transport direction and the front end of the recording paper sheet arrives the first transport unit 63 among the respective transport units 63 of the relay transport apparatus 400, the rear end of the recording paper sheet has passed the fixing roller 32.

Accordingly, while the recording paper sheet is passing the fixing roller 32, the carry-out roller 17 is controlled at the same rotation speed as a rotation speed ω1c of the fixing roller 32 by the control unit 39a of the image forming apparatus 200. When the rear end of the recording paper sheet has passed the fixing roller 32, the carry-out roller 17 is controlled at a rotation speed ω2c, which is faster than the rotation speed ω1c of the fixing roller 32.

Consequently, the recording paper sheet is carried out from the image forming apparatus 200 to the relay transport apparatus 400 at a carry-out speed V2c corresponding to the rotation speed ω2c. Based on this, the following describes the exemplary one-motor control 2 in detail.

When the judgment result signal has contents indicating that the length of the recording paper sheet in the transport direction is less than the predetermined reference length, the control unit 80c performs the one-motor control on the relay transport apparatus 400 as follows.

That is, the control unit 80c starts driving and rotating the predetermined one driving unit (for example, 64a) only at the rotation speed ω2c so that the transport speeds of the respective transport units 63 of the relay transport apparatus 400 become the same speed as a carry-out speed V2c of the carry-out roller 17 operated together with, for example, a start of acceleration of the carry-out roller 17 of the image forming apparatus 200 to the rotation speed ω2c (time t1c), based on the carry-out speed signal.

Thus, the recording paper sheet carried out from the image forming apparatus 200 to the relay transport apparatus 400 at the carry-out speed V2c is transported to the transport path S2 of the relay transport apparatus 400 at the transport speed V2c and then is carried out to the post-processing apparatus 300. Then, the control unit 80c causes another driving unit (for example, 64b) not to drive.

The recording paper sheet carried out to the post-processing apparatus 300 is transported in the post-processing apparatus 300 at the transport speed V2c.

After the last (fourth) recording paper sheet has passed the transport path S2 (time t2c), the predetermined one driving unit 64a is decelerated and then stopped.

This one-motor control drives only the predetermined one driving unit 64a, allowing reduction in power consumption.

When the length of the recording paper sheet in the transport direction is less than the predetermined reference length, the carry-out speed when the recording paper sheet is carried out from the image forming apparatus 200 to the relay transport apparatus 400 can be set to the carry-out speed V2c, which is faster than a transport speed V1c of the fixing roller 32, proving the following effects (1) and (2).

(1) The recording paper sheet can be carried out to the relay transport apparatus 400 at any timing of the image forming apparatus 200 side. This allows transportation at a short paper interval.

(2) The recording paper sheet always can be transported at the transport speed V2c (namely, a fast transport speed) in the relay transport apparatus 400.

(Operations by Post-Processing Apparatus 300)

Figure 10:
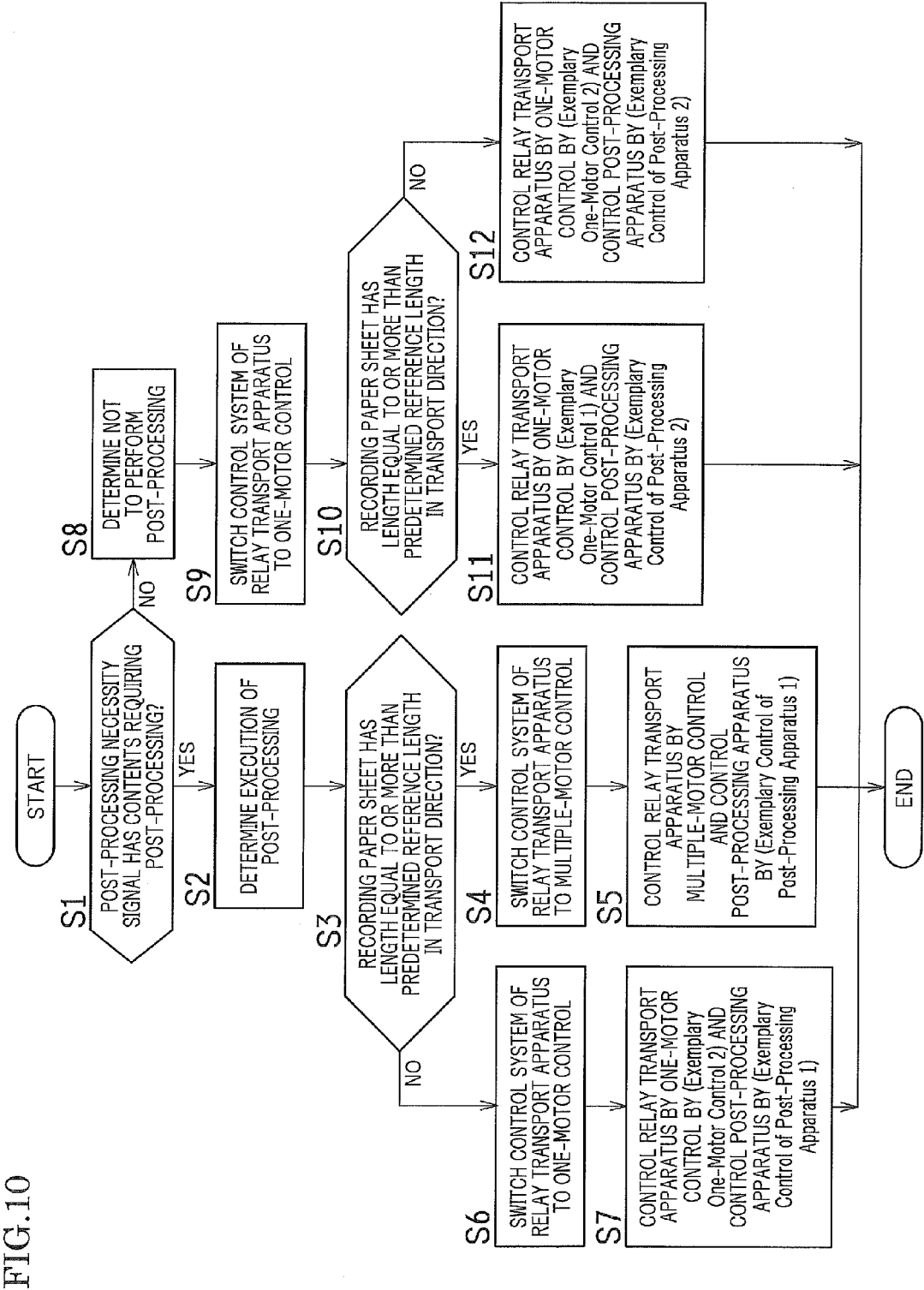
FIG. 10 is a flowchart describing operations by a post-processing apparatus illustrated in FIG. 2.

The following describes operations by the post-processing apparatus 300 based on FIG. 10. FIG. 10 is a flowchart describing operations by the post-processing apparatus 300.

When the post-processing apparatus 300 performs the post-processing, this operation prioritizes short paper interval over low power consumption. When post-processing apparatus 300 does not perform the post-processing, this operation prioritizes the low power consumption over the short paper interval.

In Step S1, when the post-processing necessity signal received by the communications unit 80a has contents requiring the post-processing, the process proceeds to Step S2. Meanwhile, when the post-processing necessity signal received by the communications unit 80a has contents not requiring the post-processing, the process proceeds to Step S8.

In Step S2, the determining unit 80*d* determines execution of the post-processing on the recording paper sheet carried in to the post-processing apparatus 300, and the process proceeds to Step S3.

In Step S3, when the judgment result signal received by the communications unit 80*a* has the contents indicating that the recording paper sheet has equal to or more than the predetermined reference length in the transport direction, the process proceeds to Step S4. The switching unit 80*b* switches the control system of the relay transport apparatus 400 to the multiple-motor control.

In Step S5, the control unit 80*c* controls the relay transport apparatus 400 by the multiple-motor control like (Exemplary Multiple-Motor Control) described above. Moreover, operated together with the control, the post-processing apparatus 300 is controlled to perform the post-processing like (Exemplary Control of Post-Processing Apparatus 1) described above.

Thus, the relay transport apparatus 400 transports the recording paper sheet carried out from the image forming apparatus 200 to the relay transport apparatus 400 by the multiple-motor control and carries out the recording paper sheet to the post-processing apparatus 300. Then, the post-processing apparatus 300 performs the predetermined post-processing on the recording paper sheet, and the recording paper sheet is discharged to the discharge tray 84. Then, the process is completed. In this case, since the relay transport apparatus 400 is controlled by the multiple-motor control, the relay transport apparatus 400 transports the recording paper sheet at the short paper interval and the fast transport speed.

Meanwhile, in Step S3, when the judgment result signal received by the communications unit 80*a* has the contents that the recording paper sheet has less than the predetermined reference length in the transport direction, the process proceeds to Step S6. The switching unit 80*b* switches the control system of the relay transport apparatus 400 to the one-motor control.

In Step S7, the control unit 80*c* controls the relay transport apparatus 400 by the one-motor control like (Exemplary One-Motor Control 1) described above. Moreover, operated together with the control, the post-processing apparatus 300 is controlled to perform the post-processing like (Exemplary Control of Post-Processing Apparatus 1) described above.

Thus, the relay transport apparatus 400 transports the recording paper sheet carried out from the image forming apparatus 200 to the relay transport apparatus 400 by the one-motor control and carries out the recording paper sheet to the post-processing apparatus 300. Then, the post-processing apparatus 300 performs the predetermined post-processing on the recording paper sheet, and the recording paper sheet is discharged to the discharge tray 84. Then, the process is completed. In this case, since the recording paper sheet has a length less than the predetermined reference length in the transport direction, the relay transport apparatus 400 transports the recording paper sheet at the short paper interval and the fast transport speed in the one-motor control as well.

Meanwhile, in Step S8, the determining unit 80*d* determines not to perform the post-processing on the recording paper sheet carried in to the post-processing apparatus 300. Further, the process proceeds to Step S9. The switching unit 80*b* switches the control system of the relay transport apparatus 400 to the one-motor control.

In Step S10, when the judgment result signal received by the communications unit 80*a* has the contents indicating that the length of the recording paper sheet in the transport direction is equal to or more than the predetermined reference length, the process proceeds to Step S11. Meanwhile, when the judgment result signal received by the communications unit 80*a* has the contents indicating that the length of the recording paper sheet in the transport direction is less than the predetermined reference length, the process proceeds to Step S12.

In Step S11, the control unit 80*c* controls the relay transport apparatus 400 by the one-motor control like (Exemplary One-Motor Control 1) described above. Moreover, operated together with the control, the post-processing apparatus 300 is controlled not to perform the post-processing like (Exemplary Control of Post-Processing Apparatus 2) described above.

Thus, the relay transport apparatus 400 transports the recording paper sheet carried out from the image forming apparatus 200 to the relay transport apparatus 400 by the one-motor control and carries out the recording paper sheet to the post-processing apparatus 300. Then, the recording paper sheet is discharged to the discharge tray 83 without the post-processing by the post-processing apparatus 300. Then, the process is completed. In this case, since the relay transport apparatus 400 is controlled by the one-motor control, allowing low power consumption. The recording paper sheet has a length less than the predetermined reference length in the transport direction, even the one-motor control of the relay transport apparatus 400 allows transporting the recording paper sheet at the short paper interval and the fast transport speed.

Meanwhile, in Step S12, the control unit 80*c* controls the relay transport apparatus 400 by the one-motor control like (Exemplary One-Motor Control 2) described above. Moreover, operated together with the control, the post-processing apparatus 300 is controlled not to perform the post-processing like (Exemplary Control of Post-Processing Apparatus 2) described above.

Thus, the relay transport apparatus 400 transports the recording paper sheet carried out from the image forming apparatus 200 to the relay transport apparatus 400 by the one-motor control and carries out the recording paper sheet to the post-processing apparatus 300. Then, the recording paper sheet is discharged to the discharge tray 83 without the post-processing by the post-processing apparatus 300. Then, the process is completed. In this case, since the relay transport apparatus 400 is controlled by the one-motor control, allowing low power consumption.

<Main Effects of Printing System 1>

As described above, with the printing system 1, the drive transmission unit 65 is configured to drive the plurality of first transport units 63 based on the output from the predetermined one driving unit 64 when only the predetermined one driving unit 64*a* operates among the plurality of driving units 64. Operating the plurality of driving units 64 drives the plurality of first transport units 63 based on outputs from the corresponding driving units 64. Accordingly, the relay transport apparatus 400 can be switched to the one-motor drive or the multiple-motor drive depending on whether to operate only a predetermined one of the plurality of driving units 64 or to operate all the driving units 64.

The one-motor drive is advantageous of reduction in power consumption. The multiple-motor drive is advantageous of transportation at short paper intervals even if the recording paper sheets are comparatively long.

The relay transport apparatus 400 is constituted as FIG. 4, allowing constituting the drive transmission unit 65 with simple constitution.

Since the relay transport apparatus 400 is constituted as FIG. 4, the constitution of the transport units 63, the respective transmission units 67, and the transmission unit 66, which is provided astride between the predetermined one driving unit 64*a* and the predetermined rotation shaft unit 63*a*1 in the segment S2*a* corresponding to the predetermined one driving unit 64*a*, are the same as the constitution of conventional relay transport apparatuses dedicated for one-motor control (namely, the conventional relay transport apparatus). Therefore, the relay transport apparatus 400 can be constituted utilizing the constitution of the conventional relay transport apparatus.

<<Modifications of First Embodiment>>

The following describes the some modifications of the first embodiment.

<Modification 1>

In the first embodiment, the respective control apparatuses 39 and 80 may be integrated into one control apparatus. The integrated control apparatus may be disposed at any of the image forming apparatus 200, the post-processing apparatus 300, and the relay transport apparatus 400. In this case, since the integrated functionality can be concentrated at one location, the constitution of the printing system 1 can be simplified.

<Modification 2>

In the first embodiment, a control function to control the relay transport apparatus 400 included in the control apparatus 80 may be separated as one control apparatus. The separated control apparatus may be disposed at the relay transport apparatus 400.

<Modification 3>

In the first embodiment, the detecting unit 39*b* detects the length of the recording paper sheet in the transport direction taken out from the sheet feed cassettes 35 and 36 based on the paper sheet size selected by an input operation to the operation input unit 38; however, this should not be constructed in a limiting sense.

For example, the image forming apparatus 200 may further include a speed detecting unit, a time detecting unit, and a length detecting unit (a second detecting unit). The speed detecting unit detects a passing speed that the recording paper sheet passes a predetermined position of the transport path S1. The time detecting unit detects passing time from when a front end of the recording paper sheet passes the predetermined position until a rear end of the recording paper sheet passes the predetermined position. The length detecting unit detects the length of the recording paper sheet in the transport direction based on the passing speed and the passing time (=the passing speed×the passing time). The speed detecting unit, the time detecting unit, and the length detecting unit may detect the length of the recording paper sheet in the transport direction taken out from the sheet feed cassettes 35 and 36.

In this case, the speed detecting unit may detect the transport speeds of the respective rollers 13, 14, and 17 as the passing speeds. The time detecting unit may include, for example, an optical photo sensor. The time detecting unit may measure time required for the recording paper sheet to pass the predetermined position by the photo sensor.

The detecting unit 39*b* thus constituted detects the length of the paper sheet in the transport direction based on the passing speed and the passing time. Accordingly, even if the paper sheets with the size other than the specified size are stacked on the sheet feed cassettes 35 and 36, the lengths of the recording paper sheets in the transport direction can be accurately detected.

<Modification 4>

In the first embodiment, the control system of the relay transport apparatus 400 (the one-motor control or the multiple-motor control) is switched based on a combination of the necessity of the post-processing by the post-processing apparatus 300 and whether the length of the recording paper sheet in the transport direction is equal to or more than the predetermined reference length or not. However, this should not be constructed in a limiting sense. For example, the control system of the relay transport apparatus 400 may be switched based on only the necessity of the post-processing by the post-processing apparatus 300 or only whether the length of the recording paper sheet in the transport direction is equal to or more than the predetermined reference length or not.

<Modification 5>

In the first embodiment, the control system of the relay transport apparatus 400 is switched according to the necessity of the post-processing by the post-processing apparatus 300. However, if a plurality of post-processing types of the post-processing apparatus 300 are available, the control system of the relay transport apparatus 400 may be switched according to the types.

<Modification 6>

In the first embodiment, the control apparatus 39 of the image forming apparatus 200 includes the judging unit 39*c*. However, the control apparatus 80 of the post-processing apparatus 300 may include the judging unit 39*c*. In this case, the judging unit 39 judges whether the length of the recording paper sheet in the transport direction is equal to or more than the predetermined reference length or not based on the paper sheet size signal received by the communications unit 80*a*. Then, the switching unit 80*b* and the control unit 80*c* in the control apparatus 80 perform the above-described processes using the judgment result of the judging unit 39*c* of this modification 6, instead of the judgment result signal.

Second Embodiment

Figure 11:
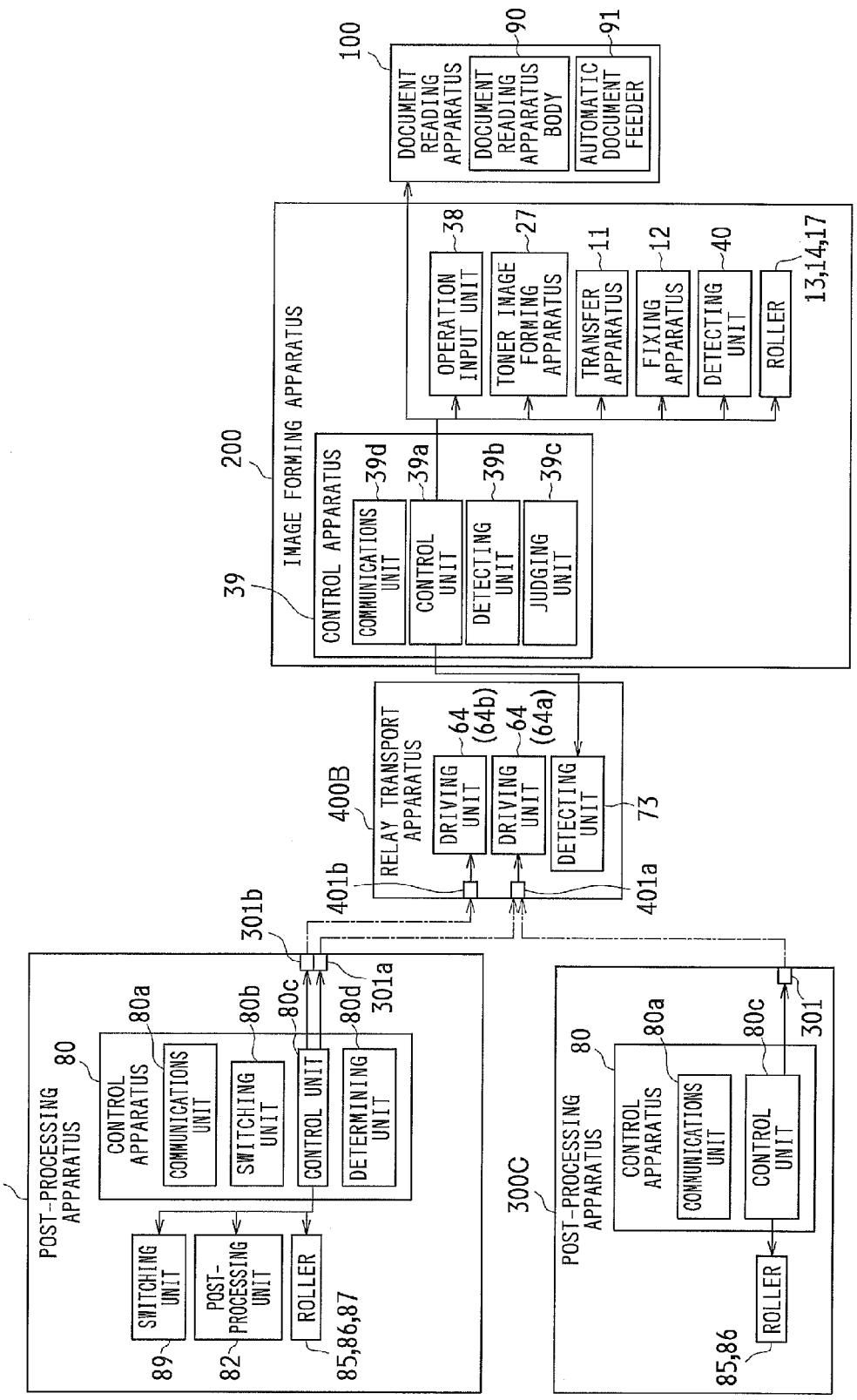
FIG. 11 is a schematic block diagram illustrating an exemplary printing system according to a second embodiment.
Figure 12:
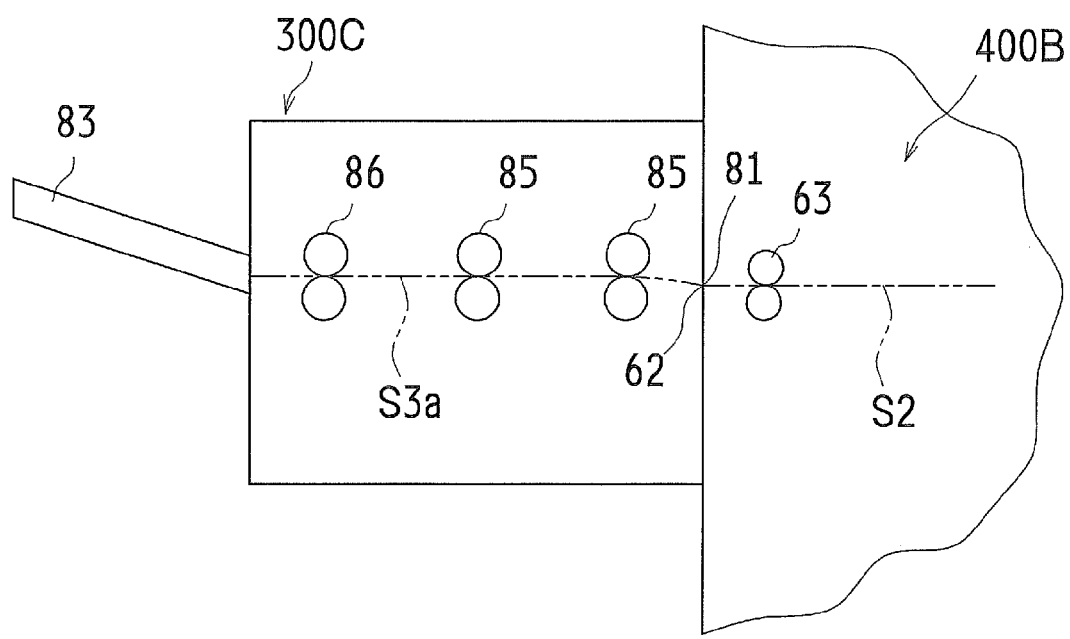
FIG. 12 illustrates a state where a post-processing apparatus 300C and a relay transport apparatus 400B illustrated in FIG. 11 are coupled.

FIG. 11 is a schematic block diagram illustrating a printing system 1B according to a second embodiment of the present invention. FIG. 12 illustrates a state where a post-processing apparatus 300C and a relay transport apparatus 400B illustrated in FIG. 11 are coupled.

This printing system 1B is constituted so that the post-processing apparatus 300 may be attachably/detachably coupled in the printing system 1 of the first embodiment. Further, the printing system 1B employs a post-processing apparatus dedicated for one-motor control (namely, a conventional post-processing apparatus) instead of the post-processing apparatus 300 (that is, the post-processing apparatus switchable between the one-motor control and the multiple-motor control). The post-processing apparatus dedicated for one-motor control controls the relay transport apparatus 400 by only the one-motor control and is attachably/detachably coupled.

The relay transport apparatus 400B of the printing system 1B, as illustrated in FIG. 11, further adds a first input terminal 401*a* and a second input terminal 401*b* to the relay transport apparatus 400 of the first embodiment. The first input terminal 401*a* inputs a first drive signal to drive the predetermined one driving unit (for example, 64*a*). The second input terminal 401*b* inputs a second drive signal to drive the respective driving units other than the predetermined one driving unit (for example, 64*b*). Among the respective components of the relay transport apparatus 400B, like reference numerals designate corresponding or identical elements throughout FIG. 11 and the relay transport apparatus 400 of the first embodiment.

In this relay transport apparatus 400B, a post-processing apparatus 300B inputs the first and the second drive signals to the first and the second input terminals 401a and 401b. This drives the respective driving units 64a and 64b similarly to the case of the first embodiment.

The post-processing apparatus 300B of the printing system 1B, as illustrated in FIG. 1, for example, further adds a first output terminal 301a and a second output terminal 301b to the control apparatus 80 of the post-processing apparatus 300 of the first embodiment. The first output terminal 301a is attachably/detachably coupled to the first input terminal 401a of the relay transport apparatus 400B. The second output terminal 301b is attachably/detachably coupled to the second input terminal 401b of the relay transport apparatus 400B. Among the respective components of the post-processing apparatus 300B, like reference numerals designate corresponding or identical elements throughout FIG. 11 and the post-processing apparatus 300 of the first embodiment.

When the post-processing apparatus 300B and the relay transport apparatus 400B are coupled while the carry-in port 81 and the carry-out port 62 communicate (see FIG. 1), the first and the second output terminals 301a and 301b are coupled to the first and the second input terminals 401a and 401b of the relay transport apparatus 400B.

To drive the predetermined one driving unit 64a of the relay transport apparatus 400B, the control unit 80c of the post-processing apparatus 300B outputs the first drive signal from the first output terminal 301a with the first output terminal 301a coupled to the first input terminal 401a. Meanwhile, to drive the respective driving units other than the predetermined one driving unit 64a (for example, 64b) of the relay transport apparatus 400B, the second output terminal 301b outputs the second drive signal from the second output terminal 301b with the second output terminal 301b coupled to the second input terminal 401b. Accordingly, the control unit 80c of the post-processing apparatus 300B drives the respective driving units 64a and 64b of the relay transport apparatus 400B with the first and the second drive signals similarly to the case of the first embodiment.

The printing system 1B can attachably/detachably couple the post-processing apparatus 300C dedicated for one-motor control instead of the post-processing apparatus 300B.

The post-processing apparatus 300C, as illustrated in FIG. 11 and FIG. 12, for example, removes the constitution regarding the post-processing (for example, the switching unit 80b, the post-processing unit 82, the transport path S3b, the discharge roller 87, and the discharge tray 84) from the post-processing apparatus 300B. Here, the post-processing apparatus 300C does not include a function regarding the post-processing. However, Similarly to the post-processing apparatus 300B, the post-processing apparatus 300C may include the function regarding the post-processing.

Among the respective components of the post-processing apparatus 300C, like reference numerals designate corresponding or identical elements throughout FIG. 11 and FIG. 12 and the post-processing apparatus 300B.

The control apparatus 80 of the post-processing apparatus 300C includes an output terminal 301. The output terminal 301 is attachably/detachably coupled to the first input terminal 401a of the relay transport apparatus 400B. When the post-processing apparatus 300C and the relay transport apparatus 400B are coupled while the carry-in port 81 and the carry-out port 62 communicate, the output terminal 301 is coupled to the first input terminal 401a of the relay transport apparatus 400B.

A control unit 80cC (a third control unit) of the post-processing apparatus 300C removes, for example, the function regarding the multiple-motor control from the control unit 80c of the post-processing apparatus 300B.

With the output terminal 301 coupled to the input terminal 401a of the relay transport apparatus 400B, the control unit 80cC of the post-processing apparatus 300C outputs a first drive signal to the relay transport apparatus 400B via the output terminal 301a based on a reception result of the communications unit 80a of the post-processing apparatus 300C.

Accordingly, the control unit 80cC drives the predetermined one driving unit 64a of the relay transport apparatus 400B by the one-motor control like, for example, the above-described (Exemplary One-Motor Control 1) or (Exemplary One-Motor Control 2). Then, the control unit 80cC causes the respective rollers 75 and 76 to drive operating together with the control.

Accordingly, the relay transport apparatus 400B transports the recording paper sheet carried out from the image forming apparatus 200 to the post-processing apparatus 300C by the one-motor drive. The recording paper sheet is transported along the transport path S3a in the post-processing apparatus 300C and discharged to the discharge tray 83.

As described above, with the printing system 1B, the relay transport apparatus 400B includes the first and the second input terminals 401a and 401b. Accordingly, the relay transport apparatus 400B can support both the post-processing apparatus dedicated for one-motor control (the conventional post-processing apparatus) 300C and the post-processing apparatus 300B switchable between the one-motor control and the multiple-motor control.

<<Supplementary Item>>

The preferred embodiments according to the present invention are described above with reference to the attached drawings; however, it is needless to say that the present invention is not limited to the above examples. It would be obvious that an ordinary skilled person conceives various modifications and corrections within scopes defined in the claims, and it should be understood that those modified examples fall within the technical scope of the present invention.

It should be understood that the invention of combination of the first embodiment, the modifications of the first embodiment, and the second embodiment also obviously fall within the technical scope of the present invention.

INDUSTRIAL APPLICABILITY

This printing system is suitable for application to, for example, a copier with electrophotographic image forming method.

DESCRIPTION OF REFERENCE SIGNS 1, 1B printing system
13 transport roller (second transport unit)
14 registration roller (second transport unit)
17 carry-out roller (second transport unit)
35, 36 sheet feed cassette
35b, 36b pickup roller (extraction unit)
38 operation input unit (acquiring unit)
39a control apparatus (second control unit)
39b detecting unit (second detecting unit)
60 carry-in port
61 carry-out port
63a rotation shaft unit
63b transport roller
63c driven roller
64 transport unit (first transport unit)
64a predetermined one driving unit
65 drive transmission unit
66 second transmission unit 67 first transmission unit
68a intermediate rotation shaft unit
68b first intermediate transmission unit
68c second intermediate transmission unit
69 one-way clutch (second one-way clutch)
70 one-way clutch (first one-way clutch)
71 one-way clutch (third one-way clutch)
72 one-way clutch (fourth one-way clutch)
80 control apparatus
80b switching unit (switching unit)
80c control unit (first control unit)
80cC control unit (third control unit)
200 image forming apparatus
300, 300B, 300C post-processing apparatus
301 output terminal
301a first output terminal
301b second output terminal
400, 400B relay transport apparatus
401a first input terminal
401b second input terminal
S1 transport path (second transport path)
S2 transport path (first transport path)
S2a, S2b segment

The invention claimed is:

1. A relay transport apparatus, comprising:
a carry-in port to which a paper sheet is to be carried in;
a carry-out port from which the paper sheet is to be carried out;
a first transport path formed so as to couple the carry-in port and the carry-out port, the first transport path including a plurality of segments;
a plurality of first transport sections disposed along the first transport path, the plurality of first transport sections being configured to transport the paper sheet carried in from the carry-in port to the carry-out port along the first transport path;
a plurality of driving sections corresponding to the respective segments, the plurality of driving sections being configured to drive the first transport section in the corresponding segment; and
a drive transmission section configured to drive the plurality of first transport sections based on an output from a predetermined one driving section while only the predetermined one driving section operates among the plurality of driving sections, the drive transmission section being configured to drive the plurality of first transport sections based on outputs from the corresponding driving sections while the plurality of driving sections operate, wherein
the first transport sections each include:
  a rotation shaft unit rotatably supported;
  a transport roller disposed at the rotation shaft unit; and
  a driven roller rotatable in contact with the transport roller,
the predetermined one driving section corresponds to a first segment, as counted in a paper sheet transport direction, among the respective segments, and
the drive transmission section includes:
  a first transmission section provided astride between the respective rotation shaft units adjacent along the first transport path, the first transmission section being configured to transmit rotation force between the respective rotation shaft units between which the first transmission section is provided astride; and
  a first one-way clutch disposed between the first transmission section and a first rotation shaft unit in a subsequent segment, the first transmission section being provided astride between a last rotation shaft unit, as counted in a paper sheet transport direction, in the segment and the first rotation shaft unit in the subsequent section, as counted in a paper sheet transport direction, wherein
the first one-way clutch is configured to transmit rotation force transmitted from the first transmission section to the first rotation shaft unit in the subsequent segment only while a rotation speed transmitted from the first transmission section to which the first one-way clutch is disposed is equal to or more than a rotation speed of the first rotation shaft unit in the subsequent section to which the first one-way clutch is disposed.

2. The relay transport apparatus according to claim 1, wherein
the drive transmission section further includes:
  a second transmission section configured to transmit an output from each of the driving sections to the predetermined rotation shaft unit in the segment corresponding to the driving section; and
  a second one-way clutch disposed between the second transmission section and the predetermined rotation shaft unit in the segment other than the segment corresponding to the predetermined one driving section, wherein
the second one-way clutch is configured to transmit rotation force transmitted from the second transmission section to the predetermined rotation shaft unit only while a rotation speed transmitted from the second transmission section to which the second one-way clutch is disposed is equal to or more than a rotation speed of the predetermined rotation shaft unit to which the second one-way clutch is disposed.

3. The relay transport apparatus according to claim 1, wherein
at least one of the respective first transmission sections includes:
  an intermediate rotation shaft unit disposed between the respective rotation shaft units between which the first transmission section is provided astride;
  a first intermediate transmission section provided astride between one of the respective rotation shaft units and the intermediate rotation shaft unit, the first intermediate transmission section being configured to transmit rotation force between the one of the respective rotation shaft units and the intermediate rotation shaft unit; and
  a second intermediate transmission section provided astride between another of the respective rotation shaft units and the intermediate rotation shaft unit, the second intermediate transmission section being configured to transmit rotation force between the other of respective rotation shaft units and the intermediate rotation shaft unit.

4. The relay transport apparatus according to claim 3, wherein
the other of the respective rotation shaft units is the last rotation shaft unit in the segment,
the one of the respective rotation shaft units is the rotation shaft unit one prior to the last rotation shaft unit,
the drive transmission section further includes a fourth one-way clutch disposed between one of the first and the second intermediate transmission sections and the intermediate rotation shaft unit, and
the fourth one-way clutch transmits rotation force between the first or the second intermediate transmission section to which the fourth one-way clutch is disposed and the intermediate rotation shaft unit only while a rotation speed of the one-prior-to rotation shaft unit is equal to or more than a rotation speed of the last rotation shaft unit.

5. The relay transport apparatus according to claim 1, wherein the drive transmission section further includes a second one-way clutch disposed between the first transmission section and a last rotation shaft unit in at least one segment among the respective segments, the first transmission section being provided astride between the last rotation shaft unit in the segment and the rotation shaft unit one prior to the last rotation shaft unit, and the second one-way clutch is configured to transmit rotation force transmitted from the first transmission section to the last rotation shaft unit only while a rotation speed transmitted from the first transmission section to which the second one-way clutch is disposed is equal to or more than a rotation speed of the last rotation shaft unit to which the second one-way clutch is disposed.

6. The relay transport apparatus according to claim 1, wherein the relay transport apparatus includes:

a first input terminal configured to input a drive signal from outside, the drive signal being configured to drive the predetermined one driving section; and a second input terminal configured to input a drive signal from outside, the drive signal being configured to drive the respective driving sections other than the predetermined one driving section.

7. The relay transport apparatus according to claim 1, further comprising:

a switching section configured to switch a first mode and a second mode, the first mode being configured to drive the plurality of driving sections, the second mode being configured to drive only the predetermined one driving section, and a first control section configured to control the plurality of driving sections based on a switching result of the switching section.

8. The relay transport apparatus according to claim 7, further comprising a first detecting section configured to detect whether the paper sheet has passed the respective segments or not, wherein when the paper sheet is carried in from the carry-in port to the first transport path at a first speed, the first control section in the first mode accelerates a transport speed of the plurality of first transport sections from the first speed to a second speed, when the first control section detects that a rear end of the paper sheet has passed the respective segments in the first transport path based on a detection result of the first detecting section, the first control section in the first mode drives the plurality of driving sections such that the transport speed of the first transport section in the passed segment is decelerated to the first speed.

9. The relay transport apparatus according to claim 7, further comprising a first detecting section configured to detect whether the paper sheet has passed the respective segments or not, wherein when the paper sheet is carried in from the carry-in port to the first transport path at a first speed, the control section in the second mode accelerates a transport speed of the plurality of first transport sections from the first speed to a second speed, when the control section detects that a rear end of the paper sheet has passed the first transport path based on a detection result of the first detecting section, the control section in the second mode drives only the predetermined one driving section such that the transport speed of the first transport section is decelerated to the first speed.

10. The relay transport apparatus according to claim 7, wherein when the paper sheet is carried in from the carry-in port to the first transport path at a first speed, the first control section in the second mode drives only the predetermined one driving section such that a transport speed of the plurality of first transport sections becomes the first speed.

11. A printing system, comprising:

the relay transport apparatus according to claim 1;

an image forming apparatus configured to form an image on a paper sheet, the image forming apparatus being configured to carry in the paper sheet from the carry-in port of the relay transport apparatus to the first transport path;

a post-processing apparatus configured to perform a post-processing on the paper sheet carried out from the carry-out port of the relay transport apparatus; and a control apparatus configured to control the relay transport apparatus.

12. The printing system according to claim 11, wherein the control apparatus includes:

a switching section configured to switch a first mode and a second mode, the first mode being configured to operate the plurality of driving sections, the second mode being configured to operate only the predetermined one driving section, and a first control section configured to control the plurality of driving sections based on a switching result of the switching section.

13. The printing system according to claim 12, further comprising a first detecting section configured to detect whether the paper sheet has passed the respective segments or not, wherein when the paper sheet is carried in from the carry-in port to the first transport path at a first speed, the first control section in the second mode accelerates a transport speed of the plurality of first transport sections from the first speed to a second speed, when the first control section detects that a rear end of the paper sheet has passed the first transport path based on a detection result of the first detecting section, the first control section in the second mode drives only the predetermined one driving section such that the transport speed of the first transport section is decelerated to the first speed.

14. The printing system according to claim 12, wherein when the paper sheet is carried in from the carry-in port to the first transport path at a first speed, the first control section drives only the predetermined one driving section in the second mode such that a transport speed of the plurality of first transport sections becomes the first speed.

15. The printing system according to claim 12, wherein the image forming apparatus includes a second detecting section configured to detect a length of the paper sheet in a transport direction, and when a detection result of the second detecting section is equal to or more than a predetermined reference length, the switching section switches a mode to the first mode, when the detection result of the second detecting section is less than the predetermined reference length, the switching section switches the mode to the second mode.

16. The printing system according to claim 15, wherein the image forming apparatus includes:

a plurality of sheet feed cassettes configured to supply paper sheets with different paper sheet sizes;

a plurality of extraction sections disposed at the respective sheet feed cassettes, the extraction sections being configured to take the paper sheets out from the sheet feed cassettes at which the extraction sections are disposed;

a second transport path coupling the respective sheet feed cassettes and the carry-in port of the relay transport apparatus;

a second transport section configured to transport the paper sheets taken out from the respective sheet feed cassettes to the carry-in port along the second transport path;

an acquiring section configured to acquire information on a paper sheet size of a paper sheet taken out; and a second control section is configured to control the extraction section disposed at the sheet feed cassette for a paper sheet size corresponding to an acquisition result of the acquiring section so as to take a paper sheet out from the sheet feed cassette, wherein the second detecting section is configured to detect a length of the paper sheet in a transport direction based on the acquisition result of the acquiring section.

17. The printing system according to claim 15, wherein the image forming apparatus includes:

a sheet feed cassette configured to supply a paper sheet;

a second transport path coupling the sheet feed cassette and the carry-in port of the relay transport apparatus;

a second transport section configured to transport the paper sheet in the sheet feed cassette to the carry-in port along the second transport path;

a speed detecting section configured to detect a passing speed that the paper sheet passes a predetermined position of the second transport path; and a time detecting section configured to detect a passing time from when a front end of the paper sheet passes the predetermined position until a rear end of the paper sheet passes the predetermined position, wherein the second detecting section is configured to detect a length of the paper sheet in a transport direction based on the passing speed and the passing time.

18. The printing system according to claim 15, wherein the image forming apparatus includes:

a sheet feed cassette configured to supply a paper sheet;

a transfer section configured to transfer a toner image on the paper sheet;

a pair of fixing rollers configured to pressurize and heat the paper sheet on which the toner image has been transferred between the pair of fixing rollers for fixation;

a second transport path configured to reach the carry-in port of the relay transport apparatus from the sheet feed cassette via the transfer section and the fixing roller sequentially; and a second transport section configured to transport the paper sheet in the sheet feed cassette to the carry-in port along the second transport path, and the predetermined reference length is a length between the fixing roller and the first transport section disposed first in the relay transport apparatus in the second transport path.

19. The printing system according to claim 12, wherein the post-processing apparatus includes:

a post-processing section configured to perform a predetermined post-processing on the paper sheet from the relay transport apparatus; and a determining section configured to determine whether to perform the predetermined post-processing on the paper sheet from the relay transport apparatus or not, wherein when the determining section determines execution of the predetermined post-processing on the paper sheet, the switching section switches a mode to the first mode, when the determining section determines not to perform the predetermined post-processing on the paper sheet, the switching section switches the mode to the second mode.

20. The printing system according to claim 12, wherein the relay transport apparatus further includes:

a first input terminal configured to input a first drive signal to drive the predetermined one driving section; and a second input terminal configured to input a second drive signal to drive the respective driving sections other than the predetermined one driving section, the control apparatus further includes:

a first output terminal attachably/detachably coupled to the first input terminal, the first output terminal being configured to output the first drive signal to the first input terminal; and a second output terminal attachably/detachably coupled to the second input terminal, the second output terminal being configured to output the second drive signal to the second input terminal, wherein the first control section is configured to output the first drive signal from the first output terminal when driving only the predetermined one driving section, and the first control section is configured to output the first and the second drive signals from the first and the second output terminals when driving the plurality of driving sections.

21. The printing system according to claim 12, wherein the relay transport apparatus further includes a first detecting section configured to detect whether the paper sheet has passed the respective segments or not, and when the paper sheet is carried in from the carry-in port to the first transport path at a first speed, the first control section in the first mode accelerates a transport speed of the plurality of first transport sections from the first speed to a second speed, when the first control section detects that a rear end of the paper sheet has passed the respective segments in the first transport path based on a detection result of the first detecting section, the first control section in the first mode drives the plurality of driving sections such that the transport speed of the first transport section in the passed segment is decelerated to the first speed.

22. The printing system according to claim 11, wherein the relay transport apparatus further includes:

a first input terminal configured to input a first drive signal to drive the predetermined one driving section; and a second input terminal configured to input a second drive signal to drive the respective driving sections other than the predetermined one driving section, and the control apparatus includes:

an output terminal attachably/detachably coupled to the first input terminal, the output terminal being configured to output the first drive signal to the first input terminal; and a third control section configured to output the first drive signal from the output terminal to drive the predetermined one driving section.

23. The printing system according to claim 11, wherein the control apparatus is mounted to the post-processing apparatus.

* * * * *